US009064154B2

(12) United States Patent
Kocks et al.

(10) Patent No.: US 9,064,154 B2
(45) Date of Patent: Jun. 23, 2015

(54) SYSTEMS AND METHODS FOR ASSOCIATING ELECTRONIC CONTENT

(75) Inventors: Peter Kocks, San Francisco, CA (US); Guoning Hu, Fremont, CA (US); Ping-Hao Wu, San Francisco, CA (US)

(73) Assignee: AOL Inc., Dulles, VA (US)

( * ) Notice: Subject to any disclaimer, the term of this patent is extended or adjusted under 35 U.S.C. 154(b) by 374 days.

(21) Appl. No.: 13/533,429

(22) Filed: Jun. 26, 2012

(65) Prior Publication Data

US 2013/0343598 A1    Dec. 26, 2013

(51) Int. Cl.
  *G06K 9/00*    (2006.01)
  *H04N 21/25*   (2011.01)
  *G06K 9/62*    (2006.01)

(52) U.S. Cl.
  CPC ............ *G06K 9/00744* (2013.01); *H04N 21/25* (2013.01); *G06K 9/6215* (2013.01)

(58) Field of Classification Search
  None
  See application file for complete search history.

(56) References Cited

U.S. PATENT DOCUMENTS

| 8,442,265 B1 | 5/2013 | Bosworth et al. |
| 8,583,725 B2 | 11/2013 | Gibson |
| 8,639,756 B2 | 1/2014 | Bostrom et al. |
| 2002/0028021 A1* | 3/2002 | Foote et al. .................... 382/224 |
| 2005/0226513 A1* | 10/2005 | Wallace et al. ............... 382/232 |
| 2007/0250502 A1 | 10/2007 | Canright et al. |
| 2009/0292685 A1* | 11/2009 | Liu et al. .......................... 707/5 |
| 2010/0275233 A1 | 10/2010 | Soohoo et al. |
| 2011/0026763 A1* | 2/2011 | Diggins ........................ 382/100 |
| 2012/0174157 A1 | 7/2012 | Stinson et al. |
| 2013/0347056 A1* | 12/2013 | Kuhlman et al. ................. 726/1 |

OTHER PUBLICATIONS

Aksoy et at., "Graph-theoretic clustering for image grouping and retrieval," Proceedings of the 1999 IEEE Computer Society Conference on Computer Vision and Pattern Recognition, vol. 1, Jun. 23, 1999, pp. 63-69.
International Search Report mailed by the European Patent Office on Sep. 10, 2013, in counterpart International Patent Application No. PCT/US2013/047565 (3 pages).

* cited by examiner

*Primary Examiner* — Nancy Bitar
(74) *Attorney, Agent, or Firm* — Finnegan, Henderson, Farabow, Garrett & Dunner LLP

(57) ABSTRACT

Systems and methods are provided for identifying and recommending electronic content to consumers. In accordance with an implementation, one or more elements of electronic content are associated to generate video graph data. In an exemplary method, information associated with first and second elements of video content is obtained and decomposed into corresponding first and second segments. A value indicative of an association between the first and second elements of video content is generated when the similarity measure satisfies at least one association rule.

22 Claims, 15 Drawing Sheets

SYSTEMS AND METHODS FOR ASSOCIATING ELECTRONIC CONTENT

BACKGROUND

1. Technical Field

The present disclosure generally relates to systems and methods for identifying electronic content in a network environment, such as the Internet. More particularly, and without limitation, the present disclosure relates to systems and methods that leverage video graph data to identify and/or provide recommendations of video content to a user.

2. Background Information

Today, the discovery of electronic content, such as online video content, presents challenges and opportunities not present within traditional broadcast television or cable television environments. For example, in a traditional broadcast television environment, a program may only be available at a particular time and on a particular channel. In contrast, electronic content is generally not distributed by a single channel or website within a network environment, such as the Internet. Instead, the electronic content, e.g., a video clip or movie, may be distributed through as many websites and other outlets as possible in order to maximize the number of viewers exposed to the electronic content. Furthermore, popular or premium electronic content is often reproduced (both legally or illegally) and widely distributed across many websites and portals, particularly as the demand or interest for the content increases with more and more viewers.

As a result, a large amount of duplicative videos and other electronic content is available across the Internet. The wide availability of duplicative electronic content, including duplicative segments of video clips, may render it difficult for a user to readily identify content of interest based on, for example, characteristics of the content, preferences of the user, and/or preference of the user's friends in a social networking environment.

In view of the foregoing, there is a need for improved systems and methods for efficiently discovering and identifying desired electronic content in a network environment, such as the Internet. Moreover, there is a need for improved systems and methods for identifying electronic content, including video content, that is dispersed across multiple websites. There is also a need for such systems and methods that can be implemented in a computer-based environment.

SUMMARY

Consistent with embodiments of the present disclosure, computer-implemented systems and methods are provided for associating video content. In one exemplary embodiment, a method is provided that obtains information associated with a first element of video content and a second element of video content, and decomposing the first and second elements of video content into corresponding first and second segments. The method includes computing a measure of similarity between a first video segment and second video segment, and determining, using a processor, whether the similarity measure associated with the first and second video segments satisfies at least one association rule. The method generates a value indicative of an association between the first and second elements of video content, when the similarity measure satisfies the association rule.

Consistent with further embodiments of the present disclosure, a system is provided having a storage device and at least one processor coupled to the storage device. The storage device stores a set of instructions for controlling the at least one processor, and wherein the at least one processor, being operative with the set of instructions, is configured to obtain information associated with a first element of video content and a second element of video content, and to decompose the first and second elements of video content into corresponding first and second segments. The processor is configured to compute a measure of similarity between a first video segment and second video segment, and to determine whether the similarity measure associated with the first and second video segments satisfies at least one association rule. The processor is configured to generate a value indicative of an association between the first and second elements of video content, when the similarity measure satisfies the association rule.

Other embodiments of the present disclosure relate to a tangible, non-transitory computer-readable medium that stores a set of instructions that, when executed by a processor, perform a method for associating video content. The method includes obtaining information associated with a first element of video content and a second element of video content, and decomposing the first and second elements of video content into corresponding first and second segments. The method also includes computing a measure of similarity between a first video segment and second video segment, and determining whether the similarity measure associated with the first and second video segments satisfies at least one association rule. The method generates a value indicative of an association between the first and second elements of video, when the similarity measure satisfies the association rule.

It is to be understood that both the foregoing general description and the following detailed description are exemplary and explanatory only, and are not restrictive of the invention as claimed. Further, the accompanying drawings, which are incorporated in and constitute a part of this specification, illustrate embodiments of the present disclosure and together with the description, serve to explain principles of the invention as set forth in the accompanying claims.

DESCRIPTION OF THE EMBODIMENTS

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
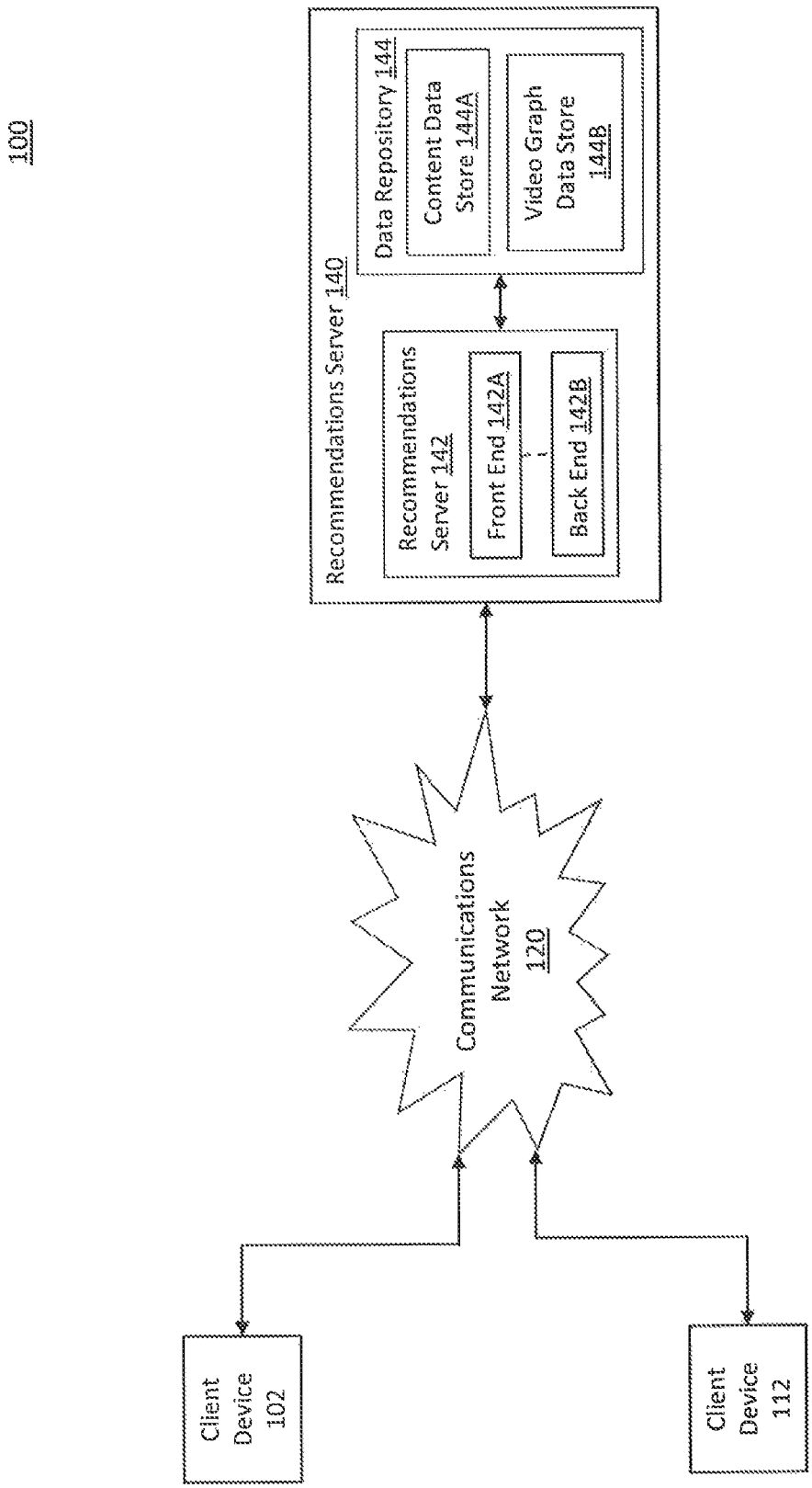
FIG. 1 is a diagram of an exemplary computing environment within which embodiments of the present disclosure may be practiced.

FIG. 1 illustrates an exemplary computing environment 100 within which embodiments consistent with the present disclosure may be practiced. In FIG. 1, a recommendations system 140 and a plurality of user devices 102 and 112 are interconnected via a communications network 120. As further disclosed herein, recommendations system 140 and user devices 102, 112 may exchange information associated with one or more elements of electronic content, e.g., video clips or segments of video clips.

In an embodiment, user devices 102 and 112 can be implemented with a processor or computer-based system. For example, user devices 102 and 112 can include, but are not limited to, a personal computer, a laptop computer, a notebook computer, a hand-held computer, a personal digital assistant, a portable navigation device, a mobile phone, a smart phone, a set top box, a third party portals, an optical disk player (e.g., a DVD player), a digital video recorder (DVR), and any additional or alternate computing device operable to transmit and receive data across network 120.

Although computing environment 100 is illustrated in FIG. 1 with two user devices 102 and 112 in communication with recommendations system 140, persons of ordinary skill in the art will recognize that environment 100 may include any number of additional number of mobile or stationary user devices, any number of additional search engines, and any additional number of computers, systems, or servers without departing from the spirit or scope of the disclosed embodiments.

Communications network 120 may represent any form or medium of digital data communication. Examples of communication network 120 include a local area network ("LAN"), a wireless LAN, e.g., a "WiFi" network, a wireless Metropolitan Area Network (MAN) that connects multiple wireless LANs, and a wide area network ("WAN"), e.g., the Internet, Consistent with embodiments of the present disclosure, network 120 may comprise the Internet and include any publicly-accessible network or networks interconnected via one or more communication protocols, including, but not limited to, hypertext transfer protocol (HTTP) and transmission control protocol/internet protocol (TCP/IP). Moreover, communications network 120 may also include one or more mobile device networks, such as a GSM network or a PCS network, that allow user devices, such as user device 102, to send and receive data via applicable communications protocols, including those described above.

Recommendations system 140 may include a recommendations server 142 and a data repository 144. Recommendations server 142 may include a front end 142A, and a back end 142B, which is disposed in communication with front end 142A. In the exemplary embodiment of FIG. 1, front end 142A and back end 142B of recommendations server 142 may be incorporated into a hardware unit, for example, a single computer, a single server, or any additional or alternate computing device apparent to one or skill in the art. Further, in such an exemplary embodiment, front end 142A may be a software application, such as a web service, executing on recommendations server 142. However, recommendations server 142 is not limited to such configurations, and, in additional embodiments, front end 142A may be executed on any computer or server separate from back end 142B.

Data repository 144 may include a content data store 144A and a video graph data store 144B. In an embodiment, content data store 144A may include elements of electronic content that, for example, may be delivered to a user device (e.g., one of user devices 102 and 112) in response requests and/or queries provided to recommendations server 142. For example, the electronic content within content data store 144A may include, but is not limited to, textual content, video content (e.g., video clips or segments of video clips), audio content, executable programs (e.g., Java scripts), and/or any additional content that is appropriate for delivery to a user device across communications network 120.

In an embodiment, content data store 144A may further include metadata associated with one or more of the elements of electronic content stored within content data store 144A. For example, the metadata may include, but is not limited to, information identifying a source of the content (e.g., a source uniform resource locator (URL) or an address of a source repository), structural information associated with the content (e.g., a type of the content and a size of the content), editorial and contextual information that describes the content, and information associated with a viewership of the content (e.g., a number of times users or particular users have accessed the content).

For example, the editorial and contextual information associated with an element of electronic content, e.g., a video clip, may include, but is not limited to, a title of the video clip, information identifying a creator of the video clip, information identifying one or more performers associated with portions of the video clip, a date on which the video clip was created, and keywords or text describing the video clip. Further, for example, the metadata associated with the video clip may also identify an event associated with or referenced by the video clip, an additional element of electronic content explicitly related to or referenced within the video clip (e.g., one or more additional episodes within a particular television series), and/or information identifying a product referenced by the video clip.

Referring back to FIG. 1, data repository 144 may also include video graph data store 144B. In an embodiment, video graph data store 144B may include information associated with one or more video graphs that describe relationships and similarities between video clips or elements of video content stored within content data store 144A and additional video content accessible to recommendations system 140 across network 120 based on, for example, audio and/or visual content associated with the video clips and users who have previously viewed the video clips.

In an embodiment, recommendations server 142 may leverage the video graph data to improve the discoverability of digital video content accessible across communications network 120 and to improve a relevance of digital video content presented to a user in response to a search query received over communications network 120. For example, recommendations server 142 may leverage the video graph data to enhance metadata about a particular video by including data from closely associated videos, to improve a ranking of results of a keyword search of videos, to recommend videos related to a video watched by a user, to discover the source videos used within a video, and/or to follow events as videos are uploaded and distributed across communications network 120.

Figure 2:
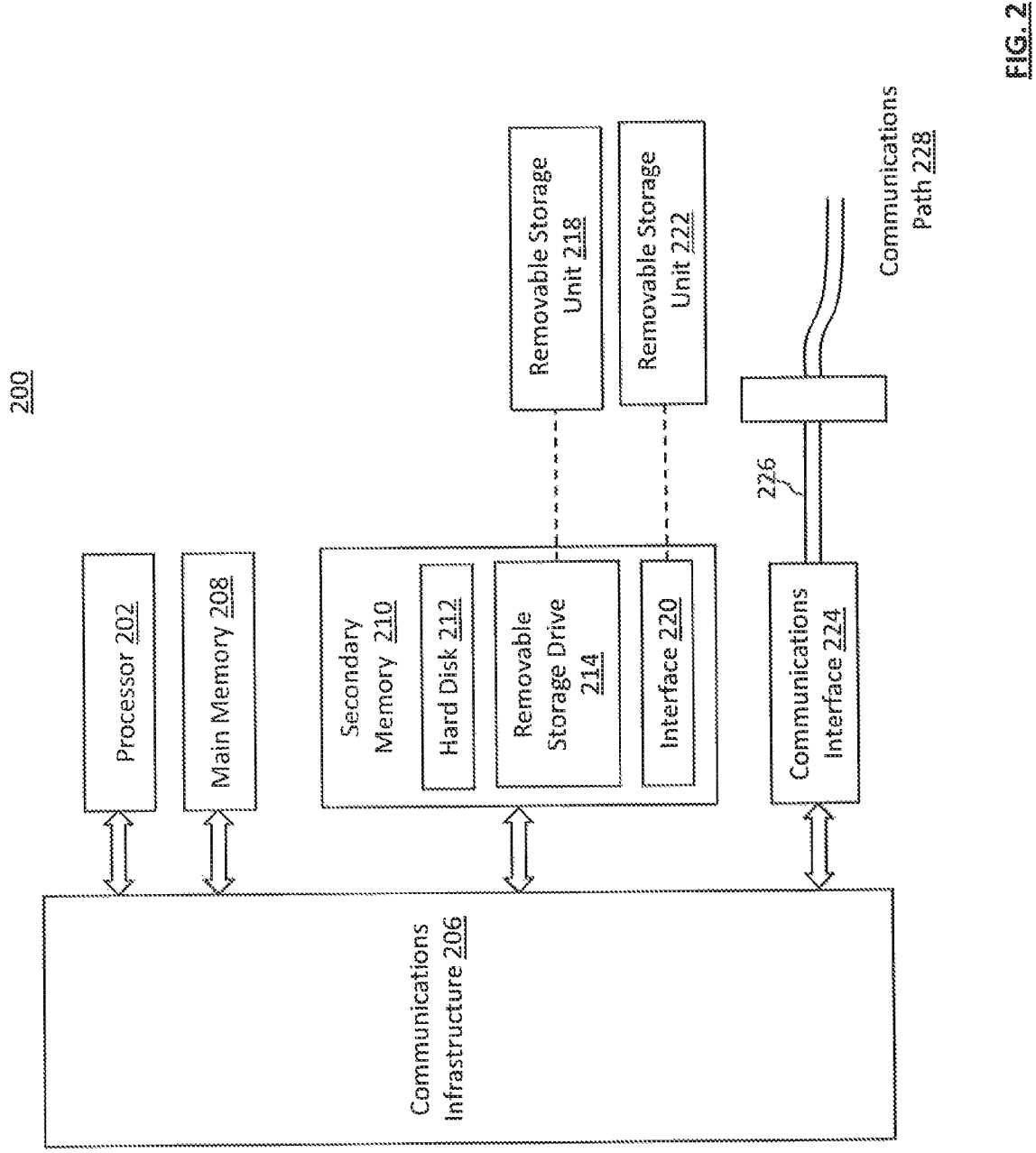
FIG. 2 is a diagram of an exemplary computer system, consistent with disclosed embodiments.

FIG. 2 is an exemplary computer system 200 with which embodiments consistent with the present disclosure may be implemented. Computer system 200 includes one or more processors, such as processor 202. Processor 202 is connected to a communication infrastructure 206, such as a bus or communications network, e.g., network 120 of FIG. 1.

Computer system 200 also includes a main memory 208, for example, random access memory (RAM), and may include a secondary memory 210. Secondary memory 210 may include, for example, a hard disk drive 212 and/or a removable storage drive 214, representing a magnetic tape drive, an optical disk drive, CD/DVD drive, etc. The removable storage drive 214 reads from and/or writes to a removable storage unit 218 in a well-known manner. Removable storage unit 218 represents a magnetic tape, optical disk, or other storage medium that is read by and written to by removable storage drive 214. As will be appreciated, the removable storage unit 218 can represent a computer readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, etc. Software and data may be transferred via communications interface 224 in the form of signals 226, which may be electronic, electromagnetic, optical or other signals capable of being received by communications interface 224. These signals 226 are provided to communications interface 224 via a communications path (i.e., channel 228). Channel 228 carries signals 226 and may be implemented using wire, cable, fiber optics, RF link, and/or other communications channels. In an embodiment of the invention, signals 226 comprise data packets sent to processor 202. Information representing processed packets can also be sent in the form of signals 226 from processor 202 through communications path 228.

The terms "storage device" and "storage medium" may refer to particular devices including, but not limited to, main memory 208, secondary memory 210, a hard disk installed in hard disk drive 212, and removable storage units 218 and 222. Further, the term "computer readable medium" may refer to devices including, but not limited to, a hard disk installed in hard disk drive 212, any combination of main memory 208 and secondary memory 210, and removable storage units 218 and 222, which respectively provide computer programs and/or sets of instructions to processor 202 of computer system 200. Such computer programs and sets of instructions can be stored within one or more computer readable media. Additionally or alternatively, computer programs and sets of instructions may also be received via communications interface 224 and stored on the one or more computer readable media.

Such computer programs and instructions, when executed by processor 202, enable processor 202 to perform the computer-implemented methods described herein. Examples of program instructions include, for example, machine code, such as code produced by a compiler, and files containing a high-level code that can be executed by processor 202 using an interpreter.

Furthermore, the computer-implemented methods described herein can be implemented on a single processor of a computer system, such as processor 202 of system 200. However, in additional embodiments, these computer-implemented methods may be implemented using one or more processors within a single computer system, and additionally or alternatively, these computer-implemented methods may be implemented on one or more processors within separate computer systems linked via a network.

As described above, a web server (e.g., recommendations server 142) may receive information associated with a video clip, and additionally or alternatively, a search query, from a user device (e.g., user device 102) across communications network 120. Recommendations server 142 may subsequently leverage data associated with one or more video graphs (e.g., as stored within video graph data store 144B) to identify additional video content similar to the video clip and/or relevant to at least a portion of the received search query.

In an embodiment, a video graph may illustrate a network of videos or video clips that include identical or similar portions of audio content, visual content, or combinations of audio and video content. For example, such video graphs may be represented as a bi-partite graph having nodes that represent video clips and edges that connect the videos clips and that are indicative of a degree of similarity between the connected video clips. For example, and as discussed above, such video clips may be associated with corresponding metadata (e.g., within content data store 144B) that includes, but is not limited to, titles of the video clips, durations of the video clips, sources of the video clips, producers of the content associated with the video clips, a quality of the video clips, an indication of an originality of the video clips, and any additional or alternate information apparent to one of ordinary skill in the art and appropriate to the video clips.

The edges that connect video clips within a video graph may be indication of an association between the two video clips, as determined by measures of similarities between corresponding segments of the video clips. For example, an association $A(i, j)$ between video clips $i$ and $j$ may be represented as a list of discrete association elements $c_k(i, j)$ corresponding to similar pairs of segments of clips $i$ and $j$, as follows:

$$A(i,j) = \{c_k(i,j)\} \qquad (1)$$

An association element $c_k(i,j)$ references a pair k of "similar" segments of the video clips having similar durations, one from video clip i and the other from video clip j, and is defined as follows:

$$c_k(i,j)=(p,d_k,t_{k,i},t_{k,j},s_{k,ij}), \quad (2)$$

where p is a type of similarity between video clips i and j (e.g., an auditory similarity, a visual similarity, and a combination of auditory and visual similarity), $d_k$ is a duration of the $k^{th}$ segment of video clips i and j, $t_{k,i}$ is a start time of the $k^{th}$ segment in video clip i, $t_{k,j}$ is a start time of the $k^{th}$ segment within video clip j, and $s_{k,ij}$ is a measure of the similarity between the $k^{th}$ segment of video clips i and j.

In such an embodiment, video clips i and j may be may be considered "associated" when video clips i and j are characterized by at least one non-zero association element. In such an embodiment, video clips i and j, and additionally or alternatively, the similar segments of video clips i and j, may be connected by corresponding edges in a video graph. Furthermore, if video clips i and j fail to share a common, non-zero association element, then these video clips are not associated and would not be linked within the video graph.

As discussed above, the association between two video clips may be determined based on, among other things, a measure indicative of a similarity between corresponding segments of the video clips, and on a determination that the similarity measure satisfies one or more associations rules. For example, the similarity between portions of two video clips or elements of video content may be based on a visual similarity, an auditory similarity, and/or a combination of the auditory and visual similarities, as described below in reference to FIGS. 3A-3C.

Figures 3A, 3B, 3C:
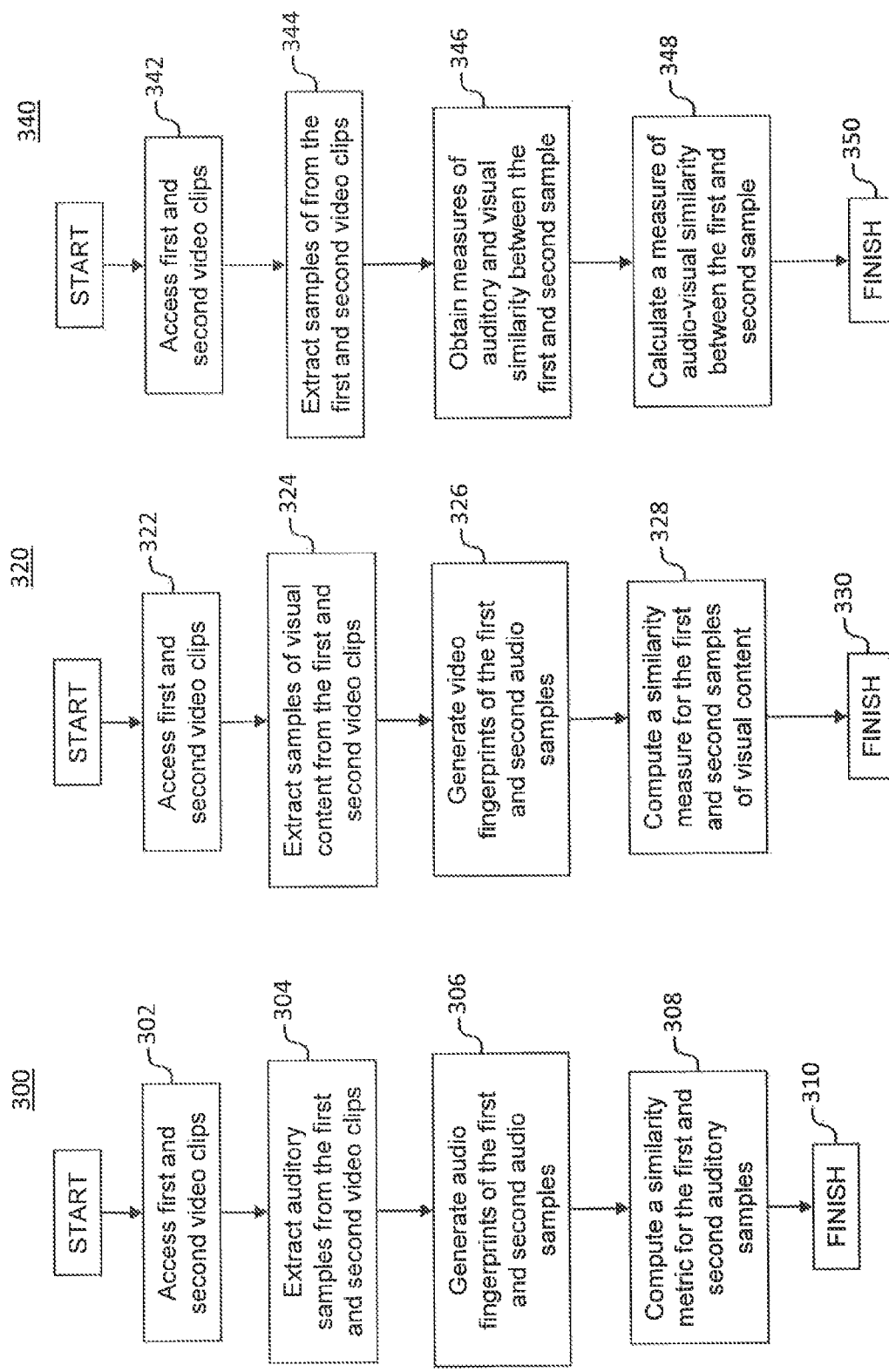
FIGS. 3A-3C are flowcharts of an exemplary methods for generating measures of similarity between elements of video content, according to disclosed embodiments.

FIG. 3A illustrates an exemplary method 300 for generating a measure of auditory similarity (i.e., p=3 in Equation (2)) between segments of a pair of video clips, in accordance with disclosed embodiments. In FIG. 3A, a pair of video clips, e.g., first video clip i and second video clip j, are accessed in step 302. For example, video clips i and j may be stored within content data store 144A and capable of being delivered to a user device, e.g., user device 102, by recommendations server 142.

In step 304, first and second auditory samples are extracted from corresponding portions of the first and second video clips. For example, in step 304, a first auditory sample $a_i(t_i,d)$ may be extracted from first video clip i starting at a temporal position $t_i$ and extending for a temporal duration d. Similarly, in step 304, a second auditory sample $a_j(t_j,d)$ may be extracted from second video clip j starting at a temporal position $t_j$ and extending for duration d.

Auditory fingerprints of first auditory sample $a_i(t_i,d)$ and second auditory sample $a_j(t_j,d)$ may be generated in step 306. For example, to generate a first auditory fingerprint in step 306, first auditory sample $a_i(t_i,d)$ may be divided into a plurality of frames, e.g., of twenty millisecond duration, and the spectrum features may be computed at each of the frames. The calculated spectrum features of the first auditory sample $a_i(t_i,d)$ and second auditory sample $a_j(t_j,d)$ may form the corresponding first and second audio fingerprints in step 306.

For example, the spectrum features of the first and second auditory samples may correspond to mel-frequency cepstrum (MFC) representation of short-term power spectrums of first and second auditory samples. In such an embodiment, the spectrum features computed at each of the frames may correspond to a set of mel-frequency cepstral coefficients (MFCCs) that collectively form the MFC representation. However, the techniques of FIG. 3A are not limited to such exemplary algorithms, and in additional embodiments, the spectrum features of an auditory sample of a digital video clip may be computed using any additional or alternate technique appropriate to the auditory sample, without departing from the spirit or scope of the disclosed embodiments.

Referring back to FIG. 3A, a metric $s_{ij}$ of the similarity between the first and second auditory fingerprints may be computed in step 308. In an embodiment, similarity metric $s_{ij}$ may be computed in step 308 based on an "average" signal-to-noise ratio across the frames of first auditory sample $a_i(t_i,d)$ and second auditory sample $a_j(t_j, d)$. For example, the spectrum features associated with first auditory sample $a_i(t_i,d)$ may be treated as "signal," and the spectrum features of second auditory sample $a_j(t_j,d)$ may be treated as "signal plus noise." An average signal-to-noise ratio may be computed for the frames of the first and second auditory samples and assigned to similarity metric $s_{ij}$ in step 308. Further, in an embodiment, the value of similarity metric $s_{ij}$ may be stored within data repository 144, for example, within metadata associated with video clips i and j within content data store 144A. Exemplary method 300 is finished and complete in step 310.

As discussed above, an association between a pair of video clips need not be limited to a similarity in auditory content. In additional embodiments, the associated between the pair of video clips may be based on a similarity between visual content of the video clips, as described in reference to FIG. 3B.

FIG. 3B illustrates an exemplary method 320 for generating a metric of visual similarity (i.e., p=2 in Equation (2)) between segments of a pair of video clips, in accordance with disclosed embodiments. In FIG. 3B, a pair of digital video clips, e.g., first video clip i and second video clip j, are accessed in step 322. As discussed above, video clips i and j may represent video clips stored within content data store 144A of data repository 144 and capable of being delivered a user device, e.g., user device 102, by recommendations server 142.

In step 324, first and second samples of visual content are extracted from corresponding portions of the first and second video clips. For example, in step 324, a first visual sample $v_i(t_i,d)$ may be extracted from first video i starting at a temporal position $t_i$ and extending for a temporal duration d. Similarly, in step 324, a second visual sample $v_j(t_j,d)$ may be extracted from second video j starting at a temporal position $t_j$ and extending for duration d.

Visual fingerprints associated with the first visual sample $v_i(t_i,d)$ and second visual sample $v_j(t_j,d)$ may be generated in step 326. For example, to generate a fingerprint associated with a visual sample (e.g., one or more of first visual sample $v_i(t_i,d)$ and second visual sample $v_j(t_j,d)$), step 326 may initially decompose the visual sample into a plurality of frames, e.g., having a duration of twenty milliseconds. Histograms may be computed for the frames of the visual sample, and differences between the histograms at consecutive frames may be determined. In such an embodiment, step 326 may assign the sequence of histogram differences as the fingerprint of the visual sample.

In step 328, a measure of a similarity $s_{ij}$ between first visual sample $v_i(t_i,d)$ and second visual sample $v_j(t_j,d)$ may be computed based on the visual fingerprints computed in step 326. For example, the similarity measure $s_{ij}$ may be computed as a correlation between the histogram differences associated with the first and second visual samples. Further, in an embodiment, the value of similarity metric $s_{ij}$ may be stored within data repository 144, for example, within metadata associated with video clips i and j within content data store 144A. Method 320 is then finished and completed in step 330.

Further, in additional embodiments, the association between the first and second video clips may computed based on measures of both an auditory similarity and a visual similarity between the pair of video clips. FIG. 3C illustrates an exemplary method 340 for generating a measure of auditory and visual similarity (i.e., p=1 in Equation (2)) between segments of a pair of digital video clips, in accordance with disclosed embodiments.

In FIG. 3C, a pair of digital video clips, e.g., first video clip I and second video clip j, are accessed in step 342. As discussed above, video clips i and j may represent videos stored within content data store 144A of data repository 144 and capable of being delivered to a user device, e.g., user device 102, by recommendations server 142.

In step 344, samples of the first and second video clips are extracted for analysis. For example, the first sample may be extracted from first video clip i starting at a temporal position $t_i$ and extending for a temporal duration d. Similarly, the second sample may be extracted from second video clip j starting at a temporal position $t_j$ and extending for duration d.

Measures of auditory and visual similarity are obtained for the first and second samples in step 346. In an embodiment, the auditory similarity between the first and second samples may be computed using exemplary method 300, as described above in reference to FIG. 3A, and the visual similarity may be computed using exemplary method 320, as described above in reference to FIG. 3B. However, the techniques of FIG. 3C are not limited to such exemplary measures of auditory and visual similarity, and in additional embodiments, the auditory and visual similarity measures may be computed using any additional or alternate technique, or may be retrieved from any appropriate source accessible to communications network 120, without departing from the spirit or scope of the disclosed embodiments.

In step 348, the auditory and visual similarities may be weighted using corresponding weight factors, and a measure of audio-visual similarity between the first and second samples may be computed based on a linear combination of the weighted auditory and visual similarities. In an embodiment, the weight factors applied to the auditory and visual similarities may be adaptively determined based on one or more characteristics of the first and second video clips. For example, such characteristics may be identified based on information within corresponding metadata metadata within content data store 144A), and such characteristics include, but are not limited to, types of the first and second video clips, sizes of the first and second video clips, and any additional or alternate information apparent to one of skill in the art. Method 340 is subsequently finished and complete in step 350.

The exemplary techniques of FIG. 3C are not limited to such adaptively-determined weight factors. In additional embodiments, the weight factors may be pre-determined by a user associated with one of the user devices (e.g., user device 102 and 112), pre-determined based on the source or creator of the first and second videos, or established in accordance with any additional or alternate algorithm or rationale, without departing from the spirit or scope of the disclosed embodiments.

In an embodiment, an association between two video clips may be based on a determination that a similarity measure corresponding to paired segments of the video clips satisfies one or more association rules. In such embodiments, an association rule may represent a set of minimum requirements for two video clips to connected within a video graph, and the association rule may enable a user to define a proper video graph based on its application.

For example, an association rule may be associated with a type of similarity measure (e.g., auditory similarity, visual similarity, or combinations thereof), a requirement on the similarity measure of an element, as described above, and a specific algorithm to calculate the measure. For example, to define a video graph that represents duplicated content among a list of video clips, an association rule may be defined to: (i) consider a similarity measure based on auditory and visual similarities; (ii) for each potential associated clip, fingerprint two corresponding video portions and compare the fingerprints to calculate a probability of whether the portions are duplicates; and (iii) include only those video portions having a similarity measure that exceeds a threshold value. By including only video clip portions that exceed the threshold value, the association rule may determine that the corresponding video clip portions are likely to be duplicates. In such embodiments, the resulting video graphs may represent a network of duplicate content throughout the list of videos.

In additional embodiments, association rules consistent with the disclosed embodiments may be used to construct video graphs linking video clips associated with common sets of auditory content, but different sets of visual content. For example, two clips of music videos for a single song performed by the Jonas Brothers may have a common audio track, but may have different visual content. Further, in such an example, the music videos may be characterized by an auditory similarity of 0.98, a visual similarity of 0.04, and a combined auditory and visual similarity of 0.51.

As discussed above, one or more association rules may be applied to the music video clips to determine whether these music video clips are connected within a corresponding video graph. For example, an association rule may determine that two video clips are connected if a corresponding similarity measure, e.g., an auditory similarity, exceeds a value of 0.9. Using a such a rule, the two music video clips would be connected within a corresponding video graph.

Association rules, consistent with the disclosed embodiments, are not limited to a single measure of similarity, and in additional embodiments, an association rule may link video clips that satisfy limitations on a plurality of types of similarity. For example, such an association rule may deem two video clips, or segments of video clips, as connected when a visual similarity exceeds a first threshold value (e.g., 0.9) and a combined auditory and visual similarity exceeds a second threshold value (e.g., 0.9). Using a such a rule, the two music video clips would not connected within a corresponding video graph.

In further embodiments, association rules consistent with the disclosed embodiments may connect segments of video clips within a corresponding video graph. For example, a first video clip may include a complete speech delivered by President Obama, and a second video clip may include portions of the speech interspersed with media commentary. Segments may be extracted from the first and second video clips, and the first and second video segments may be associated with corresponding initial positions within the first and second video clips and may share a common duration, e.g., thirty seconds.

As discussed above, an association rule may determine that the first and second video clips are connected if a corresponding similarity measure, e.g., an auditory similarity, between the segments exceeds a value of 0.9. Using a such a rule, the first and second video clips would be connected within a corresponding video graph.

In further embodiments, association rules consistent with the disclosed embodiments may incorporate limitations on types of similarity measures, and additionally or alternatively, requirements associated with one or more parameters of the video clips. For example, an association rule may determine that two video clips are connected when a value of a combined auditory and visual similarity exceeds a first threshold value (e.g., 0.9) and a duration of the two video clips exceeds a second threshold value (e.g., thirty seconds). Using such a rule, the first and second video clips would not be connected within a video graph, as the durations of the first and second video clips fail to exceed thirty seconds.

Although described in terms of a duration of a video clip, association rules consistent with the disclosed embodiments are not limited to such an exemplary characteristic. Additionally or alternatively, such association rules may impose requirements on other characteristics of the video clips, such as a requirement for a common title or producer, a requirement for a common type or quality of video, and any other parameter apparent to one of skill in the art and appropriate to the video clips. Further, for example, such association rules may leverage metadata associated with pairs of video clips (e.g., metadata within content data store 144A) to determine whether the video clips are connected within a corresponding video graph.

Figure 4:
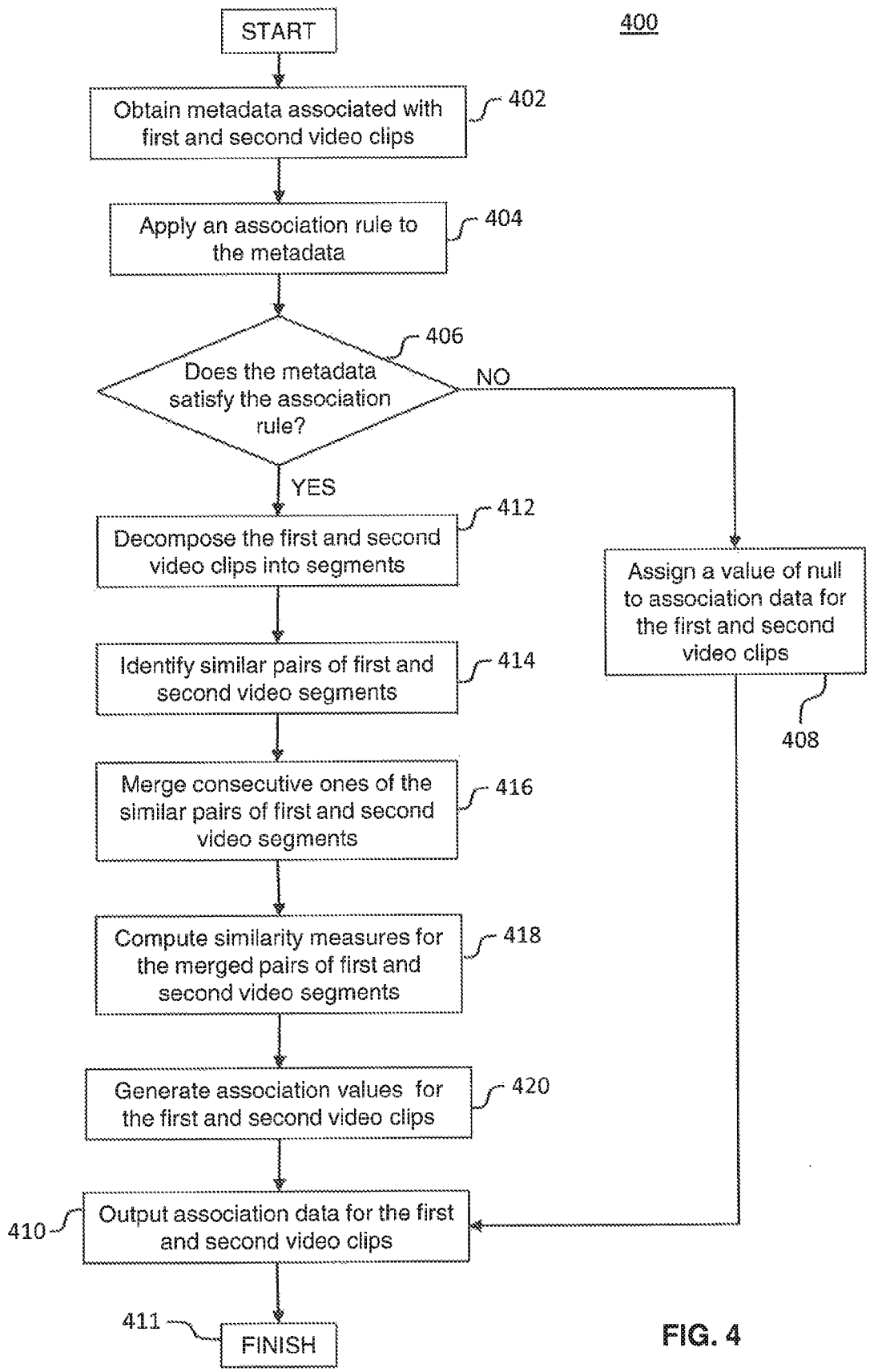
FIG. 4 is a flowchart of an exemplary method for associating elements of video content, according to disclosed embodiments.

FIG. 4 illustrates an exemplary method 400 for computing an association between a pair of video clips, in accordance with a disclosed embodiment. Method 400 may provide functionality that enables a recommendations server (e.g., recommendations server 142) to compute values indicative of an association between the video clips based on, for example, an application of one or more association rules to measures of similarity between segments of the video clips. As discussed above, and based on the computed association values, an edge within a corresponding video graph may then connect the pair of associated video clips within the video graph.

In FIG. 4, recommendations server 142 may obtain information associated with a first video clip and a second video clip in step 402. In an embodiment, the obtained information may include metadata associated with the first and second video clips, which may be obtained from a corresponding data repository (e.g., content data store 144A). The obtain metadata may include, for example, values of one or more characteristics associated with the first and second video clips.

In step 404, an association rule may be applied to the metadata associated with the first and second video clips. As discussed above, the association rule may determine a connection between a pair of video clips based on a type of similarity and based on a magnitude of a measure of that type of similarity. Further, in such embodiments, the association rule may be associated with a video graph that links videos having one or more specified relationships, including, but not limited to, video that include duplicative content. For example, the association rule identified in step 404 determine that two video clips are connected within a video graph when a measure of a corresponding auditory similarity, visual similarity, or combination of auditory and visual similarities exceeds a threshold value.

The association rule identified in step 404 may also impose limitations of one or more characteristics of connected video clips. For example, and as discussed above, such limitations may include, but are not limited to, a requirement that a duration of the video clips exceeds a threshold value, that the video clips be characterized by a specific type, quality, or file format, a source of the video clips, or any additional or alternate characteristics appropriate to the video clips.

In step 406, recommendation server 142 may determine whether the metadata associated with the first and second video clips satisfies the association rule. For example, and as discussed above, the association rule may require that connected video clips have a duration that exceeds thirty seconds. In such an embodiment, the metadata associated with the first and second videos may be processed in step 406 to extract data identifying corresponding durations, and the corresponding durations may be compared against the requirement imposed by the association rule.

If it is determined in step 406 that the metadata fails to satisfy the requirement set forth in the association rule, then no connection exists between the first and second video clips, and in step 408, recommendations server 142 may assign an association value of "null" to the association data for the first and second video clips (i.e., the vector of association values A(i,j)). For example, if the metadata indicates that a source of the first video clip is CNN.com, and a source of the second video clip is YouTube.com, then an association rule requiring that the video clips share a common source would not be satisfied, and no connection would exist between the first and second video clips. In such an embodiment, the association data for the first and second video clips may be output and stored by recommendation server 142 in step 410, and exemplary method 400 is finished and complete in step 411.

If, however, step 406 determines that the metadata of the first and second video clips is consistent with the requirements of the association rule, then the first and second video clips are decomposed into corresponding segments in step 412 for similarity analysis. For example, as discussed above, if both the first and second video clips were obtained from YouTube.com, then the association rule requiring that the video clips share a common source would be satisfied, and a potential association may exist between segments of the first and second video clips.

In an embodiment, the decomposition process of step 412 may partition the first and second video clips into corresponding video segments having a predetermined duration and being associated with a predetermined shift between consecutive segments. For example, the first and second video clips may be decomposed into corresponding segments having a five second duration and a shift of 0.1 seconds, a fifteen second duration and a shift of 0.3 seconds, or any additional or alternate duration and shift apparent to one of skill in the art and appropriate to the first and second video clips.

However, the decomposition processes of step 412 are not limited to segments associated with such predetermined durations and predetermined shifts. In further embodiments, the association rule identified in step 404 may identify at least one of a duration or shift into which the first and second video clips are decomposed. In additional embodiments, auditory and visual content associated with the first and second video clips may be analyzed to algorithmically and adaptively decompose the first and second vides into a plurality of segments.

In step 414, recommendations server 142 may analyze the first and second video segments to identify pairs of similar first and second video segments. For example, in step 414, measures of similarity may be determined for pairs of the first and second video segments based on, for example, an auditory similarity, a visual similarity, or a combination of auditory similarity and visual similarity. The identified association rule may subsequently be applied to the computed similarity measures to identify one or more pairs of similar first and second video segments, as described below in reference to FIG. 5.

Figure 5:
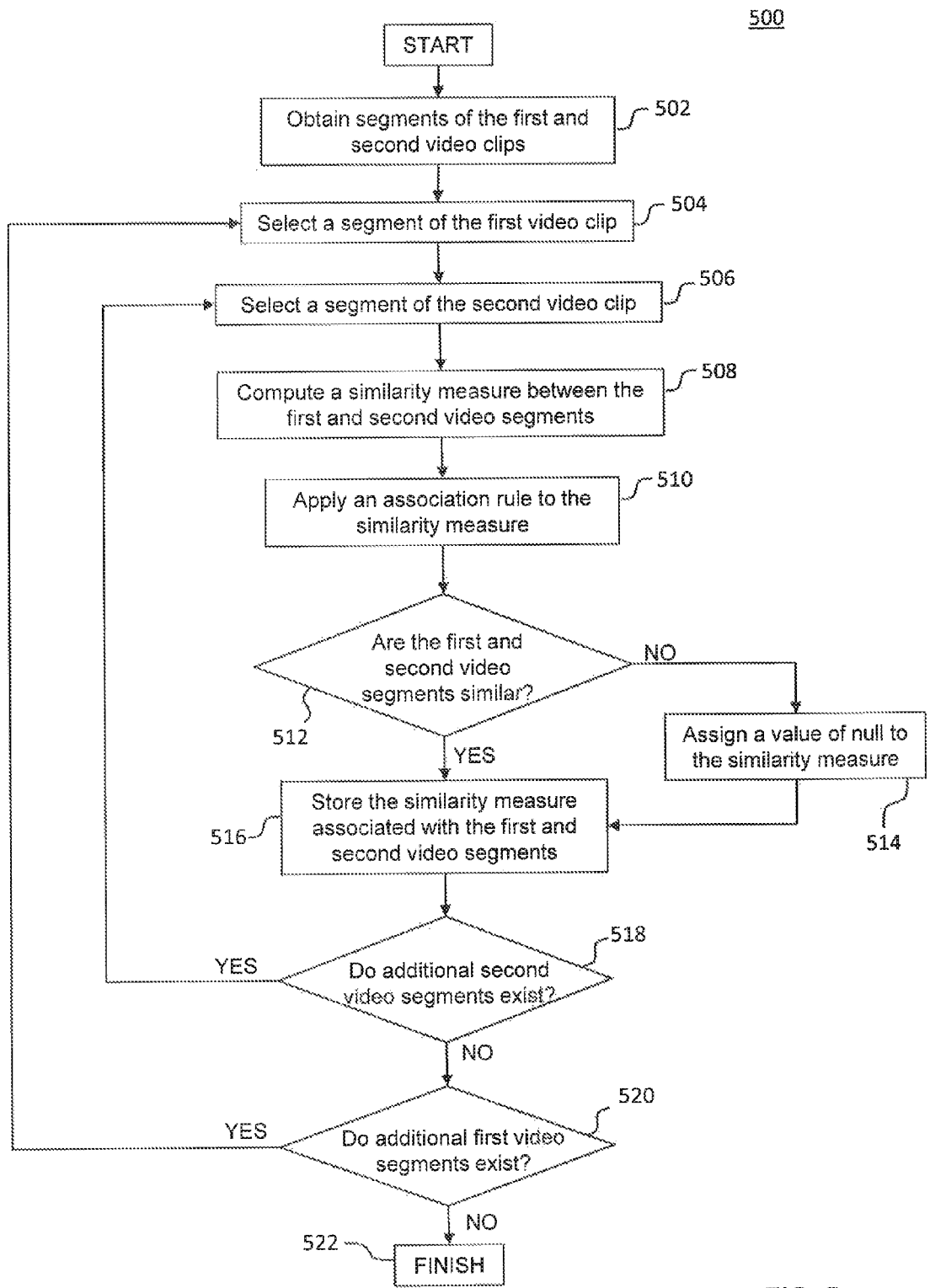
FIG. 5 is a flowchart of an exemplary method for identifying similar pairs of video segments, according to disclosed embodiments.

FIG. 5 illustrates an exemplary method 500 for identifying pairs of similar video segments, in accordance with disclosed embodiments. Method 500 may provide functionality that enables a recommendations server (e.g., recommendations server 142) to compute a measure indicative of a similarity between pairs of video segments and to determine whether the similarity measure satisfies a corresponding association rule.

In step 502, recommendations server 142 may obtain information identifying a plurality of segments of a first video clip and a second video clip. For example, as described above in reference to FIG. 4, the first and second video clips may be partitioned into corresponding segments having a predetermined duration and being associated with a predetermined shift between consecutive segments. For example, the first and second video clips may be decomposed into corresponding segments having a five second duration and a shift of 0.1 seconds, a fifteen second duration and a shift of 0.3 seconds, or any additional or alternate duration and shift apparent to one of skill in the art and appropriate to the first and second video segments.

In steps 504 and 506, recommendations server 142 may select one of the first video segments and one of the second video segments for further similarity analysis. In an embodiment, the selected first and second video segments may have starting times that correspond to starting times of the respective video clips. However, the selected first and second video segment are not limited to such exemplary starting times, and in further embodiments, recommendations server 142 may select first and second video segments disposed in any additional or alternate temporal location within the respective video clips, without departing from the spirit or scope of the disclosed embodiments.

Recommendations server 142 may subsequently compute measures indicative of a similarity between the first and second video segments in step 508. For example, as outlined above, the computed similarity measures may be based on an auditory similarity between the segments, a visual similarity between the segments, or a combination of auditory similarity and visual similarity between the segments, as discussed above in reference to FIGS. 3A-3C.

In step 510, recommendation server 142 may apply one or more association rules to the computed similarity measures. As described above, and in an embodiment, the one or more association rules may represent a set of minimum requirements for two video segments to connected within a video graph based on, for example, a type of similarity and based on a magnitude of a measure of that type of similarity. For example, the application of the association rule in step 510 may determine that the pair of video segments are connected within when a measure of a corresponding auditory similarity, visual similarity, or combination of auditory and visual similarities exceeds a threshold value.

Recommendation server 142 may determine in step 512 whether the pair of first and second video segments are similar, based on the applied association rule and the computed similarity measure. For example, in step 512, recommendation server 142 may determine whether the computed similarity measure exceeds a predetermined threshold value of the associated rule, and additionally or alternatively, whether one or more characteristics of the first and second video clips (e.g., video source, video quality, or duration) satisfy the association rule.

If it is determined in step 512 that the first and second video segments are not similar, the recommendation server 142 may assign a value of zero to the computed similarity value in step 514. In such an embodiment, the assignation of the zero value indicates that the first and second video segments are dissimilar, and recommendations server 142 may subsequently output and store the assigned value in step 516. For example, the assigned value may be stored in metadata associated with the first video clip and additionally or alternatively, with the second video clip, within content data store 144A of FIG. 1.

If, however, it is determined in step 512 that the first and second video segments are similar, method 500 passes to step 516, in which recommendation server 142 stores the computed similarity measure in metadata associated with the first video clip and additionally or alternatively, with the second video clip. Method 500 subsequently passes to step 518, which determines whether additional second video segments are available for analysis. If additional second video segments are available for analysis, then method 500 passes back to step 506, which selects an additional second video segment for similarity analysis.

Alternatively, if no additional second video segments are available for analysis, then method 500 passes to step 520, which determines whether additional first video segments exists for similarity analysis. If additional first video segments are available for analysis, then method 500 passes back to step 504, which selects an additional first video segment for similarity analysis. If, however, recommendations server 142 determines in step 520 that no additional first segments exist, then method 500 is finished and complete in step 522, and the similarity values for the pairs of first and second video segments are output to step 414 of method 400, which identifies similar pairs of first and second video segments based on the outputted similarity measures.

Referring back to FIG. 4., recommendations server may process the identified pairs of similar first and second video segments to merge neighboring similar video segments into expanded segments in step 416. For example, in step 416, recommendations server 142 may determine that the $m^{th}$ segment of the first video is similar to the $n^{th}$ segment of the second video, and that the $(m+1)^{st}$ segment of the first video is similar to the $(n+1)^{st}$ segment of the second video. In such an embodiment, the adjacent $m^{th}$ and $(m+1)^{st}$ segments of the first video may be merged into an expanded first video segment, and adjacent the $n^{th}$ and $(n+1)^{st}$ segments of the second video may be merged to form an expanded second video segment. Further, in step 416, boundaries of the merged first and second video segments may be determined based on, for example, at least one of auditory or visual content of the merged first and second video segments.

A similarity measure associated with each of the pairs of merged first video segments and the merged second video segments may be determined in step 418. For example, the merged similarity values may be computed as a linear combination of weighted similarity measures corresponding to the pairs of video segments that form the merged pairs. In such an embodiment, the similarity measure for one of pairs of video segments may be weighted in accordance with one or more characteristics of the video segments, including but not limited to a duration of the segments. However, the processes of step 418 are not limited to such exemplary techniques, and in additional embodiments, recommendations server 142 may compute the similarity measures for the merged pairs using any additional or alternate technique apparent to one of skill in the art and appropriate to the video segments.

Based on the similarity measures computed for the merged segments in step 418, and additionally or alternatively, on the similarity measures associated with the similar video segments identified in step 414, recommendations server 142 may determine association values that correspond to the pairs of video segments in step 420. For example, and as discussed above, the association value, $c_k(i,j)$, for the $k^{th}$ pair of video segments may be defined based on a type of similarity, a duration of the video segments, start times of the segments within their respective video clips, and the corresponding similarity measures.

Upon determination of the association values for the pairs of similar first and second video segments, the association values may be leveraged to generate association data for the first and second video clips (e.g., a vector of association values A(i, j), as outlined above in Equation (1)), and the association data for the first and second video clips may be output and stored in step 410. For example, the association data may be stored in video graph data store 144B or FIG. 1, and additionally or alternatively, within corresponding metadata of content data store 144A of FIG. 1. Method 400 is subsequently finished and completed in step 411.

In the embodiment described above, methods 400 and 500 may identify pairs of similar video segments from first and second video clips, and may subsequently merge adjacent pairs to similar video segments. However, the exemplary processes of FIGS. 4 and 5 are not limited to the identification and subsequent merger of adjacent pairs of similar video segments. In additional embodiments, the processes of FIGS. 4 and 5 may identify groups or clusters of similar first and second video segments, based on, for example, auditory and/or visual content within the first and second video segments. In such embodiments, the identified groups or clusters of video segments may be merged, and the boundaries of such merged segments may be determined by recommendations server 142, as outlined above in reference to step 416 of FIG. 4.

Using the processes described above, the association data generated by recommendation server 142 may indicate a relationship between the pairs of similar segments of the video clips. For example, a first video clip $V_1$ includes a complete speech delivered by President Obama, and a second video clip $V_2$ includes a portion of the speech having a duration of 15.61 seconds that is interspersed with media commentary. In video clip $V_2$, the portion of the speech starts at 11.92 seconds, and a corresponding portion of the speech begins at 30.84 seconds into video clip $V_1$. The processes of FIGS. 4 and 5 may be applied to the video clips $V_1$ and $V_2$ to generate a set of association values representative of segments of video clips $V_1$ and $V_2$ that exhibit both an auditory and a visual similarity.

As discussed above, in step 402, information associated with video clips $V_1$ and $V_2$ may be obtained from content data store 144A, and a corresponding association rule may be identified in step 404. For example, the association rule may require that similar video clips be associated with a combined measure of auditory and visual similarity that exceeds 0.9. However, the processes of FIG. 4 are not limited to such exemplary association rules, and in additional embodiments, the association rule or rules identified in step 404 may include any additional or alternate limitation on similarity type or video parameter, without departing from the spirit of the disclosed embodiments.

Video clips $v_1$ and $V_2$ may subsequently be decomposed into corresponding segments in step 412 of FIG. 4. For example, video clips $V_1$ and $V_2$ may be divided into segments having a duration of five seconds and a shift between consecutive segments of 0.1 seconds. Thus, for a relevant portion of twenty seconds, the processes of step 412 will generate 200 video segments that include the relevant portions of the first and second video clips.

For each video segment in $V_1$, the processes of step 412 identify all the similar segments in $V_2$, i.e., the segments association with a corresponding measure of auditory and visual similarity that exceeds 0.9. During such processes, one or more of the similar video segments in $V_2$ may temporally overlap, and in such embodiments, the processes of steps 412 may identify one of the overlapping similar video segments in $V_2$ is associated with the largest measure of similarity, and retain that identify overlapping video segment in $V_2$ for further analysis.

For example, step 414 may determine that a segment from $V_1$ starting at 30.8 seconds is similar to three segments from $V_2$ respectively starting at 11.8 seconds, 11.9 seconds, and 12.0 seconds within video $V_2$ and respectively being associated with similarity values of 0.91, 0.95, and 0.93. As portions of these segments overlap in temporal space, the processes of step 412 retain the video segment in $V_2$ starting at 11.9 seconds, as this segment is associated with the largest similarity measure, i.e. 0.95.

As discussed above, in step 416, adjacent segments in $V_1$ may be continuously merged to form an expanded $V_1$ segment if the adjacent segments in $V_1$ are deemed similar to corresponding adjacent segments in $V_2$. Further, as discussed above, the corresponding adjacent segments in $V_2$ may also be continuously merged to yield a similar pair of merged video segments from $V_1$ and $V_2$.

For example, a first segment from $V_1$ starting at 30.8 seconds may be similar to a first segment from $V_2$ starting at 11.9 seconds. A consecutive segment in $V_2$ starts at 30.9 seconds, and a consecutive segment from $V_2$ starts at 12.0 seconds. Assuming the two pairs of segments are associated within similarity measures that satisfy the association rule (i.e., similarity measures that exceed 0.9), the first and consecutive segments in $V_1$ are merged into an expanded $V_1$ segment, and the first and consecutive segments in $V_2$ are merged into an expanded $V_2$ segment.

As such, the merging processes of step 416 generate an expanded $V_1$ segment of 5.1 seconds starting at 30.8 seconds in $V_1$ matching an expanded $V_2$ segment of 5.1 starting at 11.9 seconds within $V_2$. Further, as the merging process is applied to each of the segments of video clips $V_1$ and $V_2$, a duration of the expanded segment may increase from 5.1 seconds to 15.6 seconds, i.e., the length of the common portion of the video clip.

After merging, the exemplary processes of step 416 may determine the boundaries of each matching expanded segments based on analysis of audio-visual scenes for video clips $V_1$ and $V_2$. For example, an abrupt visual scene change at may be identified 11.92 and 27.53 second into $V_2$, which has the highest similarity measure of 0.98 with a scene starting at 30.84 seconds into $V_1$. In such embodiment, the association between video clips $V_1$ and $V_2$, A(1,2), takes the following form:

$$A(1,2)=\{(1,15.61,30.84,11,92,0.98)\}. \quad (3)$$

In Equation (3), a similarity type p is equivalent to unity, indicating that the similarity measure relates to a combined auditory and visual similarity, a duration d of the similar segments is 15.61 seconds, a start time $t_1$ of the portion in video clip $V_1$ is 30.84 seconds, a start time $t_2$ of the portion within video clip $V_2$ is 11.92 seconds, and the resulting similarity measure $s_{12}$ is 0.98. The association value A(1,2) is subsequently stored in step 410 and method 400 is finished and completed in step 412.

Further, based on the stored association data, one or more video graphs may be generated to illustrate a network of video clips, and additionally or alternatively, segments of the video clips, that include identical or similar portions of audio and/or visual content. For example, video graphs consistent with the disclosed embodiments can be represented as bi-partite graphs having nodes that represent video clips, and edges that connects the video clips and represent an association between the two video clips, as determined by similarities between corresponding segments of the video clips, as discussed below in reference to FIGS. 6-9.

Figure 6:
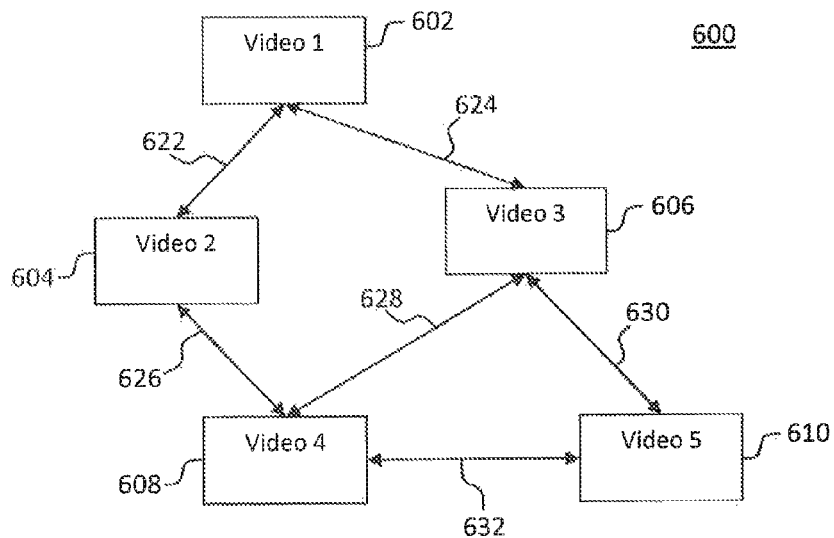
FIGS. 6-9 are diagrams of exemplary video graphs, according to disclosed embodiments.

FIG. 6 is an exemplary video graph 600 of a network of similar video clips, in accordance with one of the disclosed embodiments. In video graph 600, the exemplary network includes video clips "Video 1," "Video 2," "Video 3," "Video 4," and "Video 5," which are represented, respectively, by nodes 602, 604, 606, 608, and 610. Further, in video graph 600, edges 622, 624, 626, 628, 630, and 632 connect corresponding ones of the nodes, and are indicative of an association between the video clips associated with the nodes.

For example, in FIG. 6, edge 622 connects nodes 602 and 604, and edge 624 connects nodes 602 and 606. As such, an association exists between "Video 1" and "Video 2," and between "Video 1" and "Video 3," and at least a portion of "Video 1" is similar to corresponding segments of "Video 2" and "Video 3."

Further, in FIG. 6. edge 626 connects nodes 604 and 608, edge 628 connects node 606 to node 608, and edge 630 connects node 606 to 610. Thus, in view of video graph 600, an association exists between "Video 2" and "Video 4," between "Video 3" and "Video 4," and between "Video" 3" and "Video 6." Further, in view of edge 632 that connects nodes 608 and 610, an association exists between "Video 4" and "Video 5,"

In an embodiment, the associations described by video graph 600 may be determined through an application of one or more association rules to metadata associated with the video clips and to measures of similarity between segments of the video clips, as discussed above in reference for FIGS. 4 and 5. For example, the similarity measures may be associated with an auditory similarity between segments of video clips, a visual similarity between segments of video clips, or a combination of auditory and visual similarities, as discussed above in reference to FIGS. 3A-3C. Further, in an embodiment, information associated with video graph 600, including, but not limited to information identifying nodes, corresponding edges, and associations between video clips associated with the nodes, may be stored in a data repository accessible over network 120, e.g., video graph data store 144B.

As discussed above, metadata associated with a corresponding video clip may specify structural information associated with the video clip, such as a creation date, and contextual information associated with the video clip, such as an event or events referenced by the video clip. In such embodiments, an association rule may leverage the structural and contextual information specified within the metadata to contract a video graph that associated video clips based not only on an auditory or a visual similarity, but also on the basis of a common event referenced by the video clips and/or a chronological order of the associated video clips.

Figure 7:
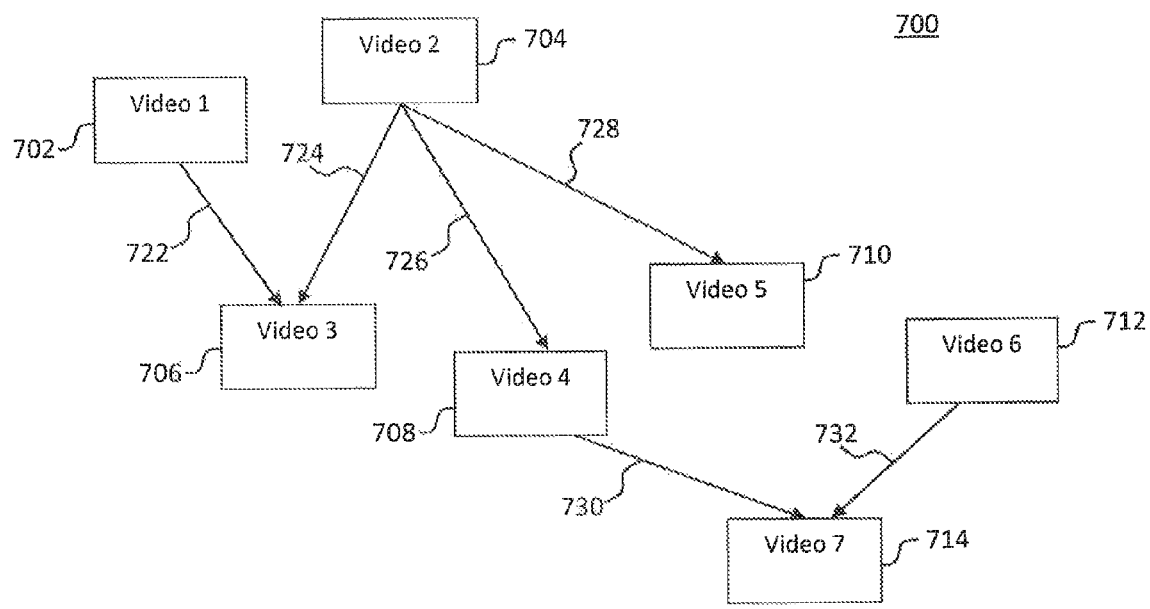

FIG. 7 illustrates an exemplary video graph 700 associated with a single chronological event, in accordance with a disclosed exemplary embodiment. In video graph 700, the exemplary network includes video clips "Video 1," "Video 2," "Video 3." "Video 4," "Video 5," "Video 6," and "Video 7," which are represented, respectively, by nodes 702, 704, 706, 708, 710, 712, and 714. Further, in video graph 700, unidirectional edges 722, 724, 726, 728, 730, and 732 connect corresponding pairs of the nodes, and indicate an association between video clips associated with the nodes.

In contrast to exemplary video graph 600 of FIG. 6, the associations between linked video clips in video graph 700 indicate not only an auditory and/or a visual similarity between linked video clips, but also a common event associated with the linked video clips and a chronological order in which the linked video clips were created. For example, as discussed above, an association rule may leverage metadat associated with the linked video clips to identify a date on which the video was created, and additionally, an event associated with or referred to within the video. For example, a unidirectional edge two linking nodes within video graph 700 indicates not only an association between the video clips associated with the nodes, but also an order in which the video clips corresponding to the linked nodes were produced or made available to users of communications network 120.

For example, in FIG. 7, unidirectional edge 722 between node 702 and node 706 indicates an association between "Video 1" and "Video 3" and further, that "Video 3" was produced subsequent to "Video 1." Similarly, for example, unidirectional edges 724, 726, and 728 between node 704 and nodes 706, 708, and 710, respectively, indicate respectively associations between "Video 2" and "Video 3," "Video 4," and "Video 5," and additionally, that "Video 3," "Video 4," and "Video 5" were produced subsequent to "Video 2." Further, in FIG. 7, unidirectional edge 730 between nodes 708 and 714 and unidirectional edge 732 between nodes 710 and 714 indicate, respectively, associations between "Video 4" and" "Video 7," and between "Video 6" and "Video 7." Unidirectional edges 730 and 732 further indicate that "Video 7" was produced subsequent to "Video 4" and "Video 6."

Further, in additional embodiments, a video graph can have multiple association rules, with each rule applying to a subset of video clips. For example, a video graph may represent a combination of multiple video graphs, which may be referred to as "sub-video graphs." In such an embodiment, the video graph can have association rules defining the association of videos within sub-video graphs, (e.g., sub-association rules), and additional association rules that define defining associations between the sub-video graphs (e.g., global association rules). For example, the sub-association rules and the global association rules may be based on, but are not limited to, auditory similarities, visual similarities, combinations of auditory and visual similarities, an association with a common event, and any additional or alternate parameter apparent to one of skill in the art and appropriate to the videos.

Figure 8:
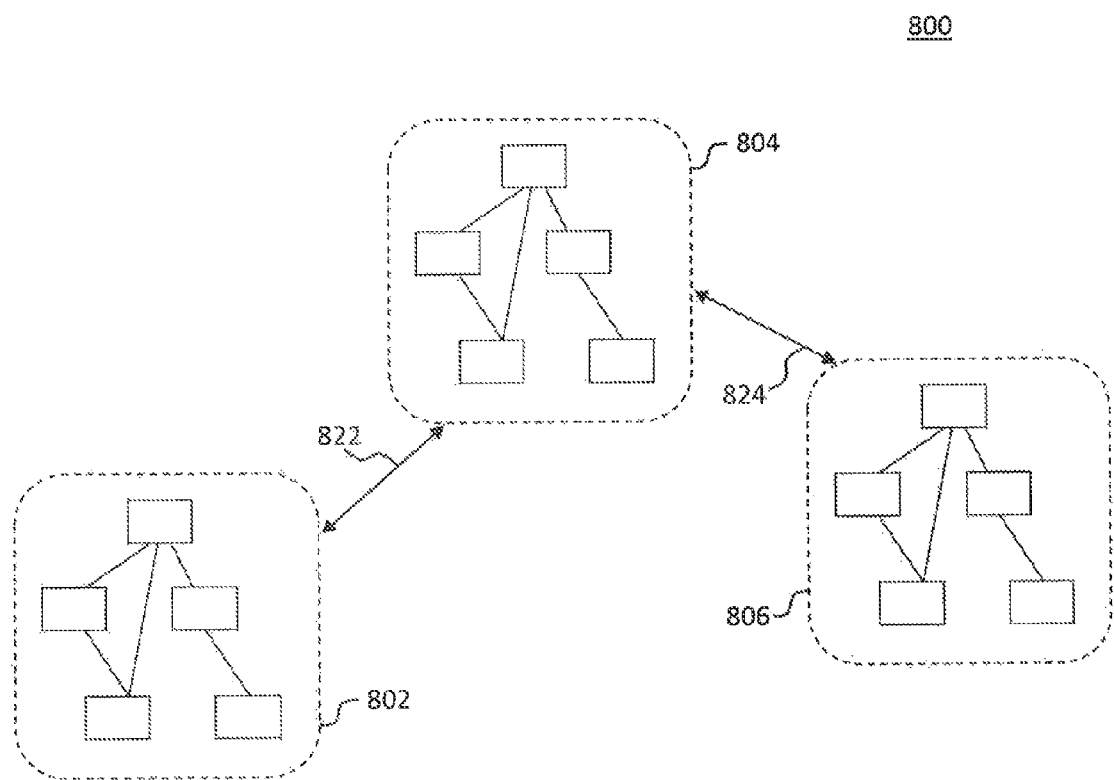

FIG. 8 is a diagram of an exemplary multiple-event video graph 800, consistent with disclosed embodiments. In FIG. 8, multiple-event video graph 800 may include single-event video graphs 802, 804, and 806. Further, in FIG. 8, edge 822 connect single-event video graphs 802 and 804, and edge 824 connects single-event video graphs 804 and 806. As discussed above, edges 822 and 824 are indicative of an association between video clips or segments of video clips within corresponding ones of single-event video graphs 802, 804, and 806. For example, the associations indicated by the edges of video graph 800 may be determined using a global association rule in accordance with one or more of the exemplary processes of FIGS. 3A-3C, 4, and 5.

For example, individual single-event video graphs 802, 804, and 806 may respectively represent networks of video clips that includes identical or similar segments of audio and/or visual content, and/or that are associated with corresponding events, as described above in reference to FIGS. 6 and 7. Further, single-event video graphs 802, 804, and 806 may be defined according to one or more sub-association rules that determine associations between linked videos and may establish a production chronology within the linked video clips.

Although described in terms of multiple, single-event video graphs, sub-video graphs consistent with the disclosed embodiments are not limited to such exemplary configurations. In additional embodiments, a video graph may include any additional or alternate set of sub-video graphs, defined in accordance with any appropriate sub-association rule, without departing from the spirit or scope of the disclosed embodiments. For example, such sub-video graphs may be defined based on sub-association rules requiring that similar video clips share a common source, are of a common file type, are of a common quality, reference a common product, were accessed by members of a pre-determined group of users, or any additional or alternate requirements apparent to one of skill in the art and determinable using metadata associated with the videos.

Moreover, the disclosed video graphs are not limited to representations of networks of similar video clips or segments of video clips. In additional embodiments, an extended video graph may include a video graph that represents of a linked network of video clips, a graph representing a social network of users (e.g., through Facebook, MySpace, LinkedIn, or Google+), and connections between the video graph and the social network graph that identify video clips viewed by specific users of the social network, as described below in reference to FIG. 9.

Figure 9:
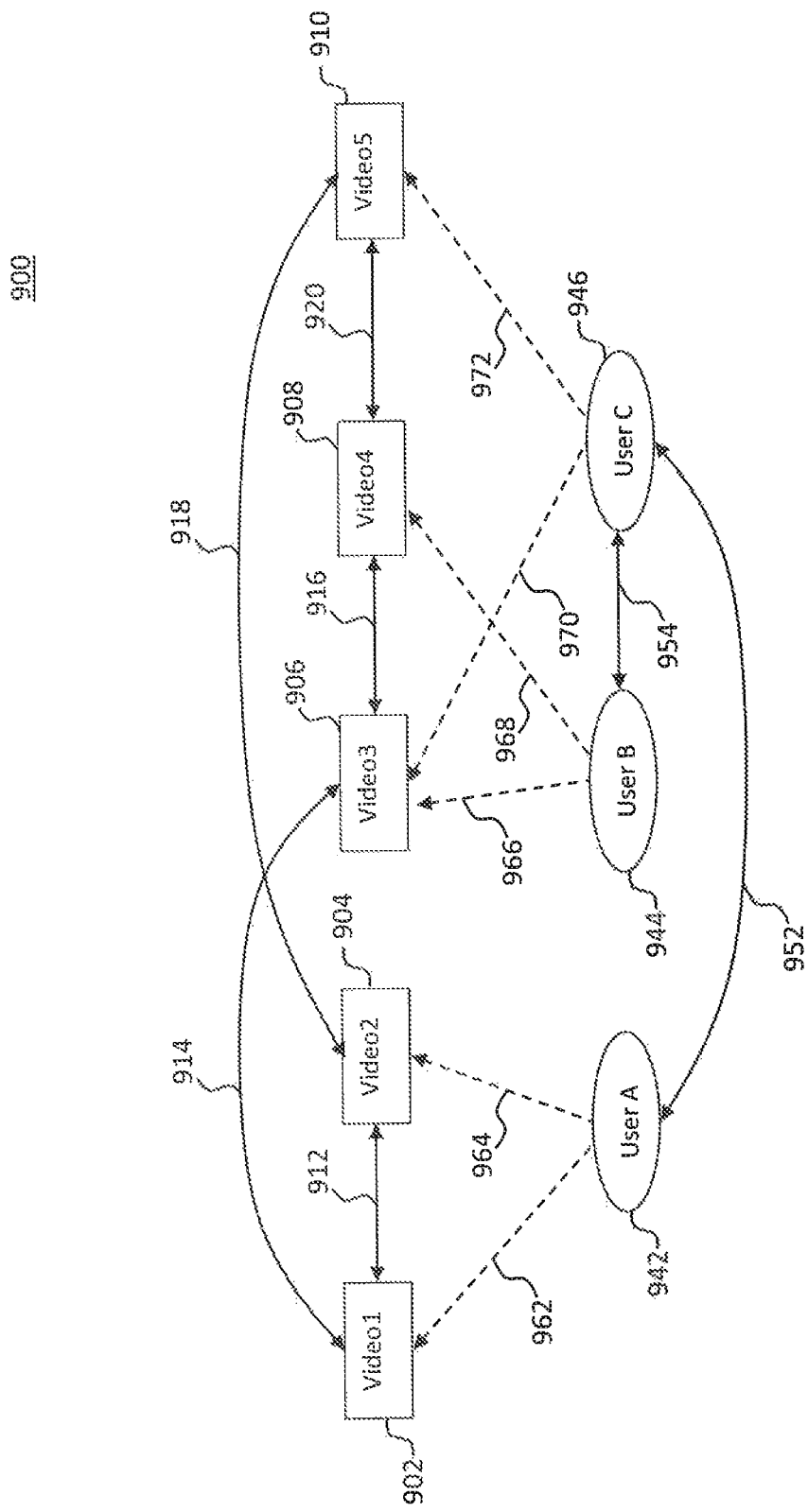

FIG. 9 is a diagram of an exemplary extended video graph 900, in accordance with a disclosed embodiment. In the embodiment of FIG. 9, extended video graph 900 includes a first "layer" of association, which corresponds to a video graph describing a network of associated video clips, and a second "layer" of association, which corresponds to set of users linked within a social network. For example, the video graph describing the first layer of association may correspond to one of exemplary video graphs described above in reference to FIGS. 6-8, and may be generated using any of the exemplary processes described above.

In FIG. 9, the first layer of extended video graph 900 includes "Video 1," "Video 2," "Video 3," "Video 4," and "Video 5," which are represented, respectively, by nodes 902, 904, 906, 908, and 910. Further, in extended video graph 900, edges 912, 914, 916, 918, and 920 connect corresponding ones of the nodes, and are indicative of an association between video clips associated with the nodes. For example, the association between the video clips in extended video graph 900 may be based on an auditory similarity, a visual similarity, a combination of auditory and visual similarities, or on a value of one or more parameters characterizing the video clips, including, but not limited to, sources of the video clips, durations of the video clips, types and qualities of the video clips, and any additional or alternate parameter appropriate to the video clips. In such embodiments, the values of such parameters may be obtained from metadata associated with the video clips, e.g., as stored within content data store 144A.

The second layer of extended video graph 900 includes "User A," "User B," and "User C," which are represented by nodes 942, 944, and 946. Further, edges 952 and 954 connect corresponding ones of the nodes and are indicative of a link between the users associated with the linked nodes. For example, edge 952 indicates that "User A" and "User C" are linked within the social network, and edge 954 indicates that "User B" and "User C" are linked within the social network.

In the embodiment of FIG. 9, the first and second layers of extended video graph 900 are linked through a pattern of video consumption exhibited by members of the social network. For example, edges 962 and 964 indicate that "User A" has accessed "Video 1" and "Video 2," edges 966 and 968 indicate that "User B" has accessed "Video 3" and "Video 4," and edges 970 and 972 indicate that "User C" has accessed "Video 4" and "Video 5."

Further, in additional to describing that users have accessed particular videos, information associated with extended video graph 900 may also characterize a nature of the users' interaction with videos. For example, information association with edge 962 may indication that "User A" has accessed with "Video 1," and may further indicate a number of times that "User A" has accessed "Video 1," segments of "Video 1" that are popular with "User A," and a date or time at which "User A" last accessed "Video 1." Such information is not, however, limited to such exemplary access information, and in additional embodiments, any additional or alternate information characterizing a user's access of a video may be stored within video graph data 144A, without departing from the spirit or scope of the disclosed embodiments.

In FIG. 9, edges that connect users within the social network may be explicitly established by users through a procedure specified by the corresponding social networking application. For example, edge 952 connection "User A" and "User C" may indicate that "User A" requested a connection with "User C" within the social networking application, that the "User C" subsequently affirmed the request to establish the connection. However, the association between users of the social networking application is not limited to such an exemplary procedure, and in additional embodiments, an association between users may be established automatically based on a pattern of video consumption, as described below in reference to FIG. 10.

Figure 10:
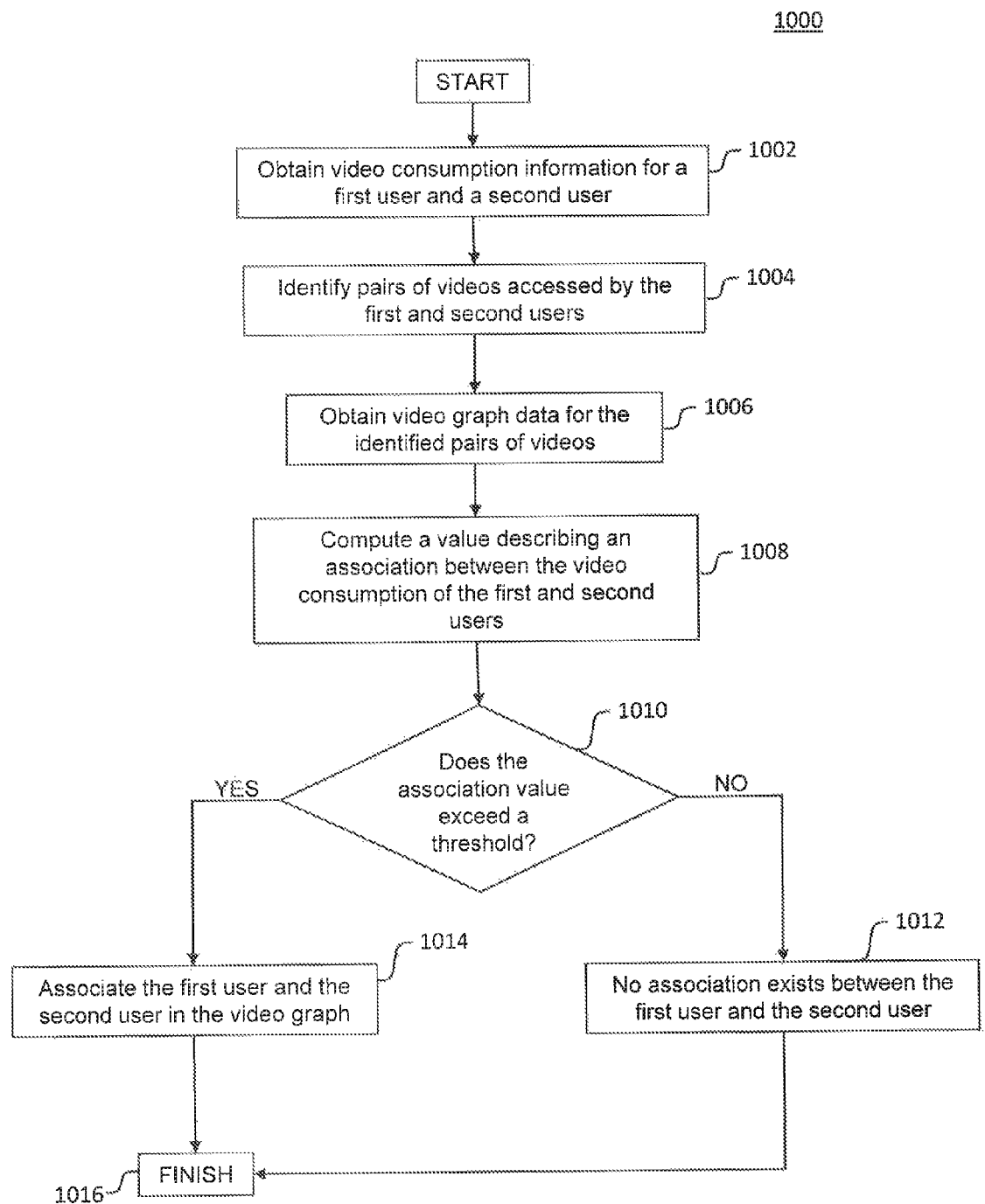
FIG. 10 is a flowchart of an exemplary method for associating users based patterns of video consumption, according to disclosed embodiments.

FIG. 10 is a flowchart of an exemplary method 1000 for associating users based patterns of video consumption, in accordance with a disclosed embodiment. Method 1000 may provide functionality that enables a recommendations server (e.g., recommendations server 142) to automatically associate of members of a social network based on corresponding patterns of multimedia content consumption. However, the exemplary processes of FIG. 10 are not limited to members of social networks, and in additional embodiments, method 1000 may be applied to multimedia consumption patterns associated with any additional or alternate linking of users, or to any number of arbitrary users.

In FIG. 10, information associated with a video consumption pattern of a first user and a video consumption pattern of a second user is obtained in step 1002. In an embodiment, the information may indicate a list of videos accessed by a user and a number of times the user accessed the videos. For example, such information may be stored within a data repository accessible via communications network 120, e.g., data repository 144 of FIG. 1.

In step 1004, the video consumption data associated with the first and second users may be processed to identify one or more pairs of video clips accessed by the first user and the second user. Video graph data for the identified pairs of video clips may be access in step 1006 from, for example, video graph data store 144B of FIG. 1. For example, the video graph data may correspond to an extended video graph that identifies associations between video clips and additionally, associations between individual users capable of accessing the video clips, as described above in reference to FIG. 9.

A value indicative of an association between the video consumption patterns of the first and second users may be computed in step 1008 based on, for example, the video consumption data obtained in step 1002 and the video graph data obtained in step 1004. For example, the computed association value may represent a an average association value computed across the pairs of video clips identified in step 1004. In such an embodiment, each of the pairs of video clips identified in step 1004 contributes equally to the average association value, and may be associated with corresponding weight factors of unity.

In additional embodiments, the computation of the association value in step 1008 may represent a weighted average of the association values of the pairs of video clips identified in step 1004. For example, the association values for the pairs of video clips may be weighted in accordance with a frequency at which the pairs of video clips have been accessed by the first and second users, and additionally or alternatively, an indication of a time or date at which the pairs of video clips were last accessed by the first and second users. Further, in additional embodiments, the association values for the video clips may be further weighted to account for any additional or alternate factor relevant to the video consumption patterns of the first and second users, without departing from the spirit or scope of the disclosed embodiments.

Step 1010 subsequently determines whether the association value computed in step 1008 exceeds a threshold value. If it is determined in step 1010 that the association value for the first and second users does not exceed the threshold value, then step 1012 determines that no association exists between the first and second users. In such an embodiment, method 1000 is finished and completed in step 1016.

Alternatively, if it is determined in step 1010 that the association value for the first and second users exceeds the threshold value, then an association is established in step 1014 between the first and second users, and a corresponding edge connects the first and second users in a video graph, e.g., edge 952 of extended video graph 900. The video graph information stored in a corresponding data repository, e.g., video data store 144 of FIG. 1, may subsequently be updated to reflect the association between the first and second users. Exemplary method 1000 is finished and completed in step 1016.

The exemplary processes of FIG. 10 may identify an association between individual users that access and consume multimedia, and in particular, video content. Further, the processes of FIG. 10 may facilitate the association of individual users, regardless of whether the individual users are members of a social network, and additionally or alternatively, without an affirmative action by the individual users (e.g., a request to associate).

To illustrate the exemplary processes of FIG. 10, consider that a first user x accesses a set of video clips X, and user y accesses a set of video clips Y. In step 1002, video consumption information for user x and video consumption information for user y is accessed. For example, user x may be associated with video consumption information $X=\{x_1(1, 1), x_2(3, 3), x_3(1, 0)\}$, and user y may be associated with video consumption information $Y=\{y_1(1, 1), y_2(2, 1), y_3(3, 2), y_4(1, 0), y_5(1, 0)\}$. In such an exemplary embodiment, video consumption information takes the form $z(i, j)$, in which i represents a number of times a video clip was accessed by a user, and j represents a number of times the accessed video clip was consumed by the user.

Pairs of video clips possibly viewed by user x and user y may be identified in step 1004, and video graph data associated with the identified pairs of videos may be obtained in step 1006. As described above, the video graph data may include association values A corresponding to the identified pairs, and the obtained video graph data for the identified pairs takes the following form:

$$A(x_1,y_1)=\{(1,21.1,1.9,2.1,0.99)\}; \quad (4)$$

$$A(x_2,y_2)=\{(1,12.3,4.1,32.5,0.93)\}; \quad (5)$$

$$A(x_2,y_3)=\{(1,12.3,20.6,11.7,0.96)\}; \quad (6)$$

$$A(x_1,y_2)=A(x_1,y_3)=A(x_1,y_4)=A(x_1,y_5)=\{\ \}; \quad (7)$$

$$A(x_2,y_1)=A(x_2,y_4)=A(x_2,y_5)=\{\ \}; \text{ and} \quad (8)$$

$$A(x_3,y_1)=A(x_3,y_2)=A(x_3,y_3)=A(x_3,y_4)=A(x_3,y_5)=\{\ \}, \quad (9)$$

in which "{ }" corresponds to a null set.

In step 1008, a summary value describing an association between user x and user y may be computed based, for example, the video graph data obtained for the pairs of videos in step 1006. Summary association values B may be initially calculated for the pairs of videos based on the association values. For example, the summary association values may be set to unity if a pair of videos are associated, and zero is the pair of videos is not association, as follows:

$$B(x_1,y_1)=B(x_2,y_2)=B(x_2,y_3)=1; \quad (10)$$

$$B(x_1,y_2)=B(x_1,y_3)=B(x_1,y_4)=B(x_1,y_5)=0; \quad (11)$$

$$B(x_2,y_1)=B(x_2,y_4)=B(x_2,y_5)=0; \text{ and} \quad (12)$$

$$B(x_3,y_1)=B(x_3,y_2)=B(x_3,y_3)=B(x_3,y_4)=B(x_3,y_5)=0. \quad (13)$$

The association value for user x and user y may be computed based on the summary association values. For example, as discussed above, the association value may be computed as a simple average of the summary association values of the pairs of videos. In such an embodiment, each accessed video clip pair is weighted equally, and the average association value between user x and user y takes the following form:

$$\frac{\sum B(x_i, y_j)}{N_X N_Y} = \frac{3}{3 \times 5} = 0.2, \quad (14)$$

where $N_X$ and $N_Y$ are the number of video clips in lists X and Y.

In additional embodiments, and as discussed above, accessed video clips that are watched more frequently may be assigned a larger weight factor in the computation of the average association value in step 1008. For example, weight factors for video clips $x_i$ and $y_j$ based on video consumption may be computed as follows:

$$w(x_i) = \frac{c_i}{C_X}; \text{ and} \quad (15)$$

$$w(y_j) = \frac{c_j}{C_Y}, \quad (16)$$

where c is the times a particular video being watched, and $C_X=1+3+1=5$ and $C_Y=1+2+3+1+1=8$ represent the total times user x and y watched videos, respectively. The corresponding weighted average association takes the following form:

$$\Sigma w(x_i)w(y_j)B(x_i,y_j)=1/5 \times 1/8 \times 1 + 3/5 \times 2/8 \times 1 + 3/5 \times 3/8 \times 1 = 0.4. \quad (17)$$

As discussed above, step 1010 determines whether the association value between the users x and y exceeds a threshold value. An association between users x and y may be established in step 1014 if the association value exceeds the threshold, and alternatively, step 1012 determines that no association exists between users x and y when the association value does not exceed the threshold. As described above, the association of users x and y may proceed automatically without user intervention, or alternatively, the association may require an affirmative validation by one or both of users x and y.

Using the exemplary techniques outlined above, recommendations system 140 may generate video graphs that represent networks of video clips that include identical or similar segments of audio and/or visual content, and additionally or alternatively, that are accessed by similar viewers or groups of viewers. In such embodiments, recommendations system 140 may leverage the generated video graphs to share metadata between linked first and second video clips, and additionally or alternatively, to enhance the metadata associated with the linked first and second video clips using information available to recommendations system 140 across communications network 120.

For example, the first and second video clips may be associated with a particular episode of broadcast or cable television series. In such an embodiment, recommendations system 140 may obtain information associated with the particular episode, including but not limited to, a title of the series, a title of the particular episode, and actors associated with the episode, and may update the metadata associated with the first and second video clips to include the obtained information. Similarly, the first and second video clips may be associated with a movie, and recommendations system 140 may update the metadata associated with the first and second video clips to include information associated with the movie, including but not limited to, a title of the movie, a textual description of the movie, and one or more actors associated with the movie.

Further, for example, recommendations server may update the metadata of the first and second video clips of a music video to add information associated with the music video, which may includes, but is not limited to: a name of a song; a name of a corresponding album; and/or data associated with one or more performers. Additionally, if the linked first and second video clips reference a common geographic location or a common event, recommendation system 140 may enhance the metadata of the linked first and second videos to including information associated with the common geographic location or event.

However, such exemplary enhancement processes are not limited to metadata associated with linked videos, and in additional embodiments, recommendations system may enhance metadata associated with individual consumers of video content, as identified within the second layer of association within the video graph of FIG. 9. In such an embodiment, a user of a social networking application may be associated with corresponding metadata identifying one or more video clips consumed by the user, and recommendations system 140 may leverage video graph data to enhance the metadata of the user to identify additional videos of potential interest to the user. For example, the metadata may be augmented to include information identifying additional video clips associated with an event (e.g., a common television show or movie), a scene (e.g., sports scenes, action scenes, and funny scenes), an individual (e.g., a musician, an actor/actress, or a politician), or other video characteristics (e.g., a channels, a language, a category, or an available time) referenced by the video clips consumed by the user.

Further, using the exemplary techniques outlined above, recommendations system 140 may leverage the generated video graphs to enhance a set of recommended videos that may be provided to a user. For example, a content provider (e.g., a news organization, such as nytimes.com, and a provider of streaming video, such as hulu.com and youtube.com) may provide a user with one or more "default" lists of video content, which may be displayed to the user at a user device (e.g., user device 102). In such embodiments, a web site associated with a new organization may organize available video content into lists corresponding to popularity and content, e.g., economic news and/or international news, and may provide information associated with these lists to the user.

The web site may further enable the user to select one of the displayed lists, and to browse through a plurality of videos associated with the selected list to select a video of interest. Upon selection of the video by the user, user device 102 may, either programmatically or in response to a user instruction, establish a connection with video recommendations system 140 over network 120, and may subsequently transmit information identify the selected video, and additionally or alternatively, the selected video list, to a web server associated with recommendations server 142. In such an embodiment, video recommendations system 140 may leverage the generated video graphs to identify additional video content that is contextually similar to the selected video and/or the selected video list, and additionally or alternatively, that has been viewed by other users having viewing habits similar to the user, as described below in reference to FIG. 11.

Figure 11:
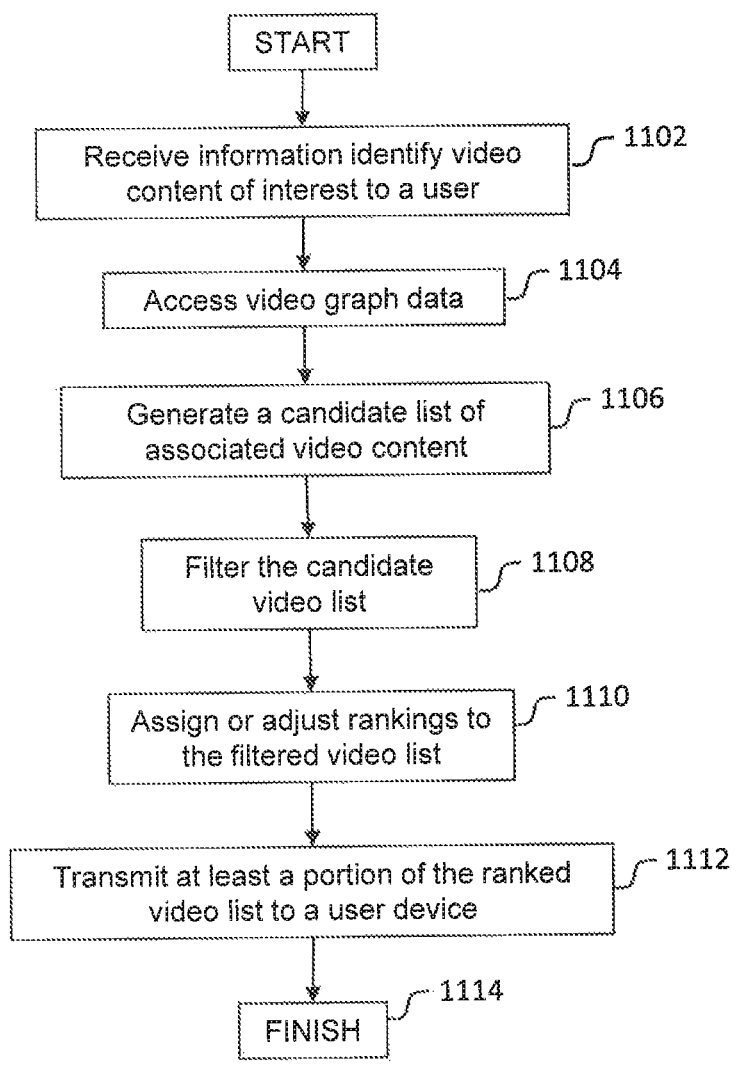
FIG. 11 is a flowchart of an exemplary method for identifying similar elements of video content, according to disclosed embodiments.

FIG. 11 is a flowchart of an exemplary method 1100 for providing identifying video content based on video graph data, according to disclosed embodiments. Method 1100 may provide functionality that enables a recommendations system (e.g., recommendations system 140) to identify additional video content having contextual similarity with video content selected by a user, and additionally or alternatively, that has been viewed by other users whose viewing habits are similar to the user, and to provide the additional video content to the user as a set of ranked recommendations.

In step 1102, recommendations server 142 may receive information identifying one or more first elements of video content (e.g., one or more first video clips) of interest to a user. For example, and as described above, the information may identify one or more video clips that include, but are not limited to, a video clip selected by the user for viewing, and additionally or alternatively, video clips associated with a selected list of video clips.

In an embodiment, the information associated with the selected video clips may include, but is not limited to, identifiers of the selected video clips and metadata associated with the selected video clips. For example, the metadata associated may include, but is not limited to: information identifying sources of the selected video clips (e.g., a source uniform resource locator (URL) or an address of a source repository); structural information associated with the selected video clips (e.g., a quality of the video clip and a size of the video clip; editorial and contextual information associated with the selected video clips; and/or information associated with a viewership of the selected video clips (e.g., a number of times users or particular users have accessed the video).

Further, in additional embodiments, the information received in step 1102 may identify the user that selected the video clips. For example, the information identifying the user may include: a alpha-numeric identifier associated with the user; authentication information association with the user; a login and password that enables a user to access one or more social networking application; and/or any additional or alternate information identifying information. Further, in an embodiment, the information identify a user may specify one or more social networking applications with which the user is associated, and additionally or alternatively, one or more additional users that are associated with the user within the social networking applications.

Upon receipt of the information, in step 1104, recommendations server 142 may access data associated with one or more video graphs that reference the selected video clips (e.g., as stored within video graph data store 144B of FIG. 1). In such embodiments, the one or more video graphs may indicate an association between portions of the selected video clips and corresponding portions of additional video clips based on, for example, an auditory similarity, a visual similarity, a combination of an auditory and a visual similarity, similar values of characteristic parameters (e.g., one or more of the metadata parameters outlined above), and additionally or alternatively, based on popularity of the additional video clips with linked users (e.g., as expressed through an expanded video graph that links associated videos to corresponding associated users).

In step 1106, recommendations server 142 may leverage the video graph data to select one or more of additional video clips that are associated with the selected video clips. For example, the video graph data may include association values that express the degree of similarity between segments of the selected video clip and corresponding segments of the additional video clips. In such embodiments, recommendations server 142 may select a subset of these potentially-associated video clips having association values that exceed a threshold association value for presentation to the user. Information associated with these additional video clips may be combined with information associated with the selected video clips to form a candidate video list in step 1106.

In an embodiment, a predetermined number of the selected video clips and the additional video clips may be selected in step 1106 for inclusion within the candidate list. For example, the selected and additional video clips may be assigned initial ranks in accordance with one or more factors, and recommendations server 142 may select a predetermined number of the selected and additional video clips in step 1106 for inclusion within the candidate video list. In such embodiments, the factors facilitating the initial ranking of the video clips may include, but are not limited to, a number videos linked to each of the video clips, a popularity of the video clips, and any additional or alternate factor available from the accessed video graph data.

Recommendations server 142 may filter the candidate video list of videos in step 1108. In an embodiment, the filtering processes of step 1108 may leverage the accessed video graph data to identify a group or groups of videos that are identical or substantially similar, and to retain a video clip from the group that is associated with a highest quality and/or a quality that is suited to the user. For example, although a video clip suitable for playback on a high-definition display unit is available within a group of identical or substantially-similar video clips, a video clip of lower quality may be retained in step 1108 when that video clip is more consistent with the needs of the user. Similarly, among a group of identical or substantially similar video clips, a video may be discarded if that video clip has been previously viewed by the selecting user, or if that video clip was accessed by the selecting user but never viewed.

Additionally or alternatively, the filtering processes of step 1108 may also leverage video graph data to identify video clips within the candidate list that are similar or identical to video clips watched by users associated with the selecting user, i.e., users connected to the selecting user through a corresponding social network, as described above in reference to FIG. 9. In such an embodiment, videos within the augmented list that are identical or similar to those consumed by one or more of the users associated with the selecting user may be retained within the filtered list.

In step 1110, recommendations server 142 may adjust the rankings assigned the video clips within the filtered video list. For example, and as discussed above, recommendations server 142 may access video graph data associated with the filtered video list. In such an embodiment, recommendation server may adjust an existing ranking of, or assign a new ranking to, a particular video clip in step 1110 based on a number of video clips associated with the particular video clip within the video graph data.

For example, a large number of such associations may indicate that the particular video clip is especially important or interesting to other users, as other users of recommendations system 140 may have copied auditory and/or visual content of the particular video clip to other video clips identified within, for example, the accessed video graph data. In such embodiments, the ranking assigned to the particular video clip may be directly proportional to the number of associations within the video graph data.

However, the ranking of the video clips within step 1110 need not be based only on the accessed video graph data. In additional embodiments, recommendations server 142 may leverage metadata associated with the particular video clip to determine a number of videos associated with that video clip, and may subsequently assign a ranking to the video clip in step 1110 based on the determined number of associations, as described above.

For example, as discussed above, the video clip may be associated with metadata that indicates a degree of similarity between the particular video clip and other video clips. In such embodiments, the degree of similarity may be determined based on a number of videos that describe a common event (e.g., a broadcast television program, a cable program, or a movie), that include a common scene or type of scene (e.g., sports, action, or comedy scene), or that are associated with a common individual (e.g., an actor, a politician, or a musician). The degree of similarity is not, however, limited to such exemplary indicia, and in further embodiments, the degree of similarity between video content may be based on any additional or alternate element of metadata, including, but not limited to, a broadcast channel, a country of origin, a video category, or a time slot.

The exemplary ranking process of step 1110 are not limited to rankings based on associations between videos within corresponding video graphs, and in additional embodiments, recommendations server 142 may assign a ranking to a selected video clip based on a consumption of the selected video clip by other users, and additionally or alternatively, a consumption of video clips having content similar to that of the selected video clip. Further, a segment of a video clip may be deemed important or interesting when video clips that incorporate the segment have been accessed by many users. Accordingly, a ranking assigned to a video clip may be directly proportional to a number of users that have consumed the video clip, a number of user that have accessed the video clip, that have accessed the or that have accessed or consumed video content similar to the video clip.

Referring back to FIG. 11, in step 1112, recommendations server 142 may transmit information associated with the ranked video clips to user device 102, which may receive the receive the information, render the received information, and display the information associated with the video clips to the requesting user in accordance with the ranking. Further, in addition to the ranked video list, recommendations server 142 may also generate video graph information corresponding to the filtered video set for transmission to user device 102. For example, such video graph data may include, but is not limited to, a list of video clips associated with at least one of the ranked video clips. In such embodiments, method 1100 is finished and completed in step 1114.

Figure 12A:
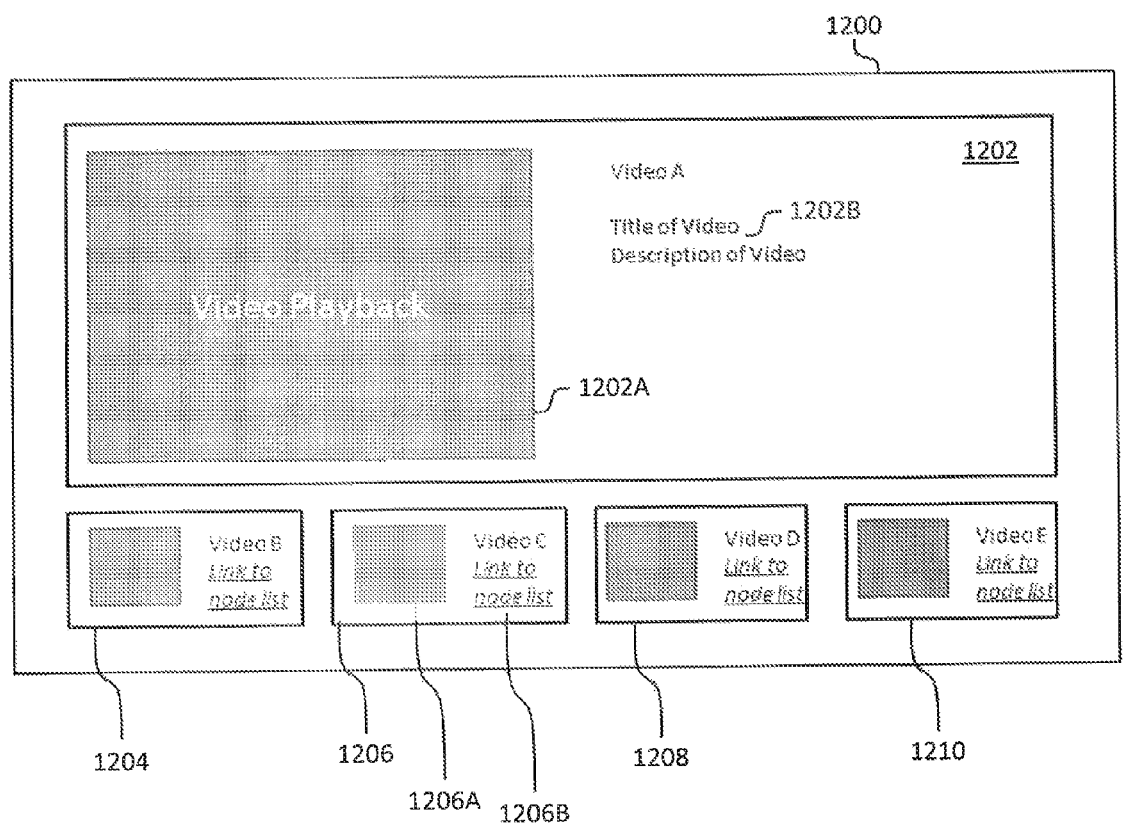
FIGS. 12A and 12B are diagrams of exemplary interfaces for displaying video content, according to disclosed embodiments.

Upon receipt of the filtered video list, user device 102 may present the filtered video list to the user, as depicted below in FIGS. 12A and 12B. FIG. 12A illustrates an exemplary interface 1200 through which a user device may present a ranked list of video clips to a user, according to disclosed embodiments. In the exemplary interface of FIG. 12A, the user has selected "Video A," and the selected video is displayed to the user within an embedded display window 1202A disposed within region 1202.

Further, in region 1202, additional information identifying the selected video clip, including a title of the video clip and a textual description of the video clip, may be included within in portion 1202B of region 1202. For example, such information may be obtained from metadata associated with the selected video clip and provided by the content provider or recommendations server 142.

In the exemplary embodiment of FIG. 12A, the filtered video set generated by recommendations server 142 includes video clips "Video B," "Video C," "Video D," and "Video E." which may be displayed in corresponding locations 1204, 1206, 1208, and 1210 within interface 1200. Further, in FIG. 12A, previews and video graph information of "Video B," "Video C," "Video D," and "Video E" may be displayed within corresponding ones of locations 1204, 1206, 1208, and 1210 within interface 1200.

For example, in location 1206, a preview of "Video C" may be displayed within to the user within region 1206A, and video graph data associated with the "Video C" may be displayed in region 1206B. For example, the displayed preview may include, but is not limited to, a portion of "Video C," a still image associated with a portion of "Video C," or any additional or alternate representation of the subject matter of "Video C" apparent to one of skill in the art. Further, for example, the video graph data corresponding to "Video C" may include, but is not limited to, one or more embedded hyperlinks that direct a user to video clips associated with "Video C." In such an embodiment, the user may click or otherwise activate a portion of the one of the embedded hyperlinks to access the associated video clip. For example, the user may click or otherwise activate a portion of region 1206A, in which the preview of "Video C" is displayed, to gain access for video content associated with "Video C."

In additional embodiments, not depicted in FIG. 12A, locations 1204, 1208, and 1210 may include regions that display respective previews of "Video B," "Video D," and "Video E," and further regions that display video graph data including embedded hyperlinks to video content associated, respectively, with "Video B," "Video D," and "Video E." In such embodiments, the user may click on a preview to gain access to a corresponding video clip, or may click on a hyperlink to gain access to a video clip associated with the corresponding video, as described above.

Figure 12B:
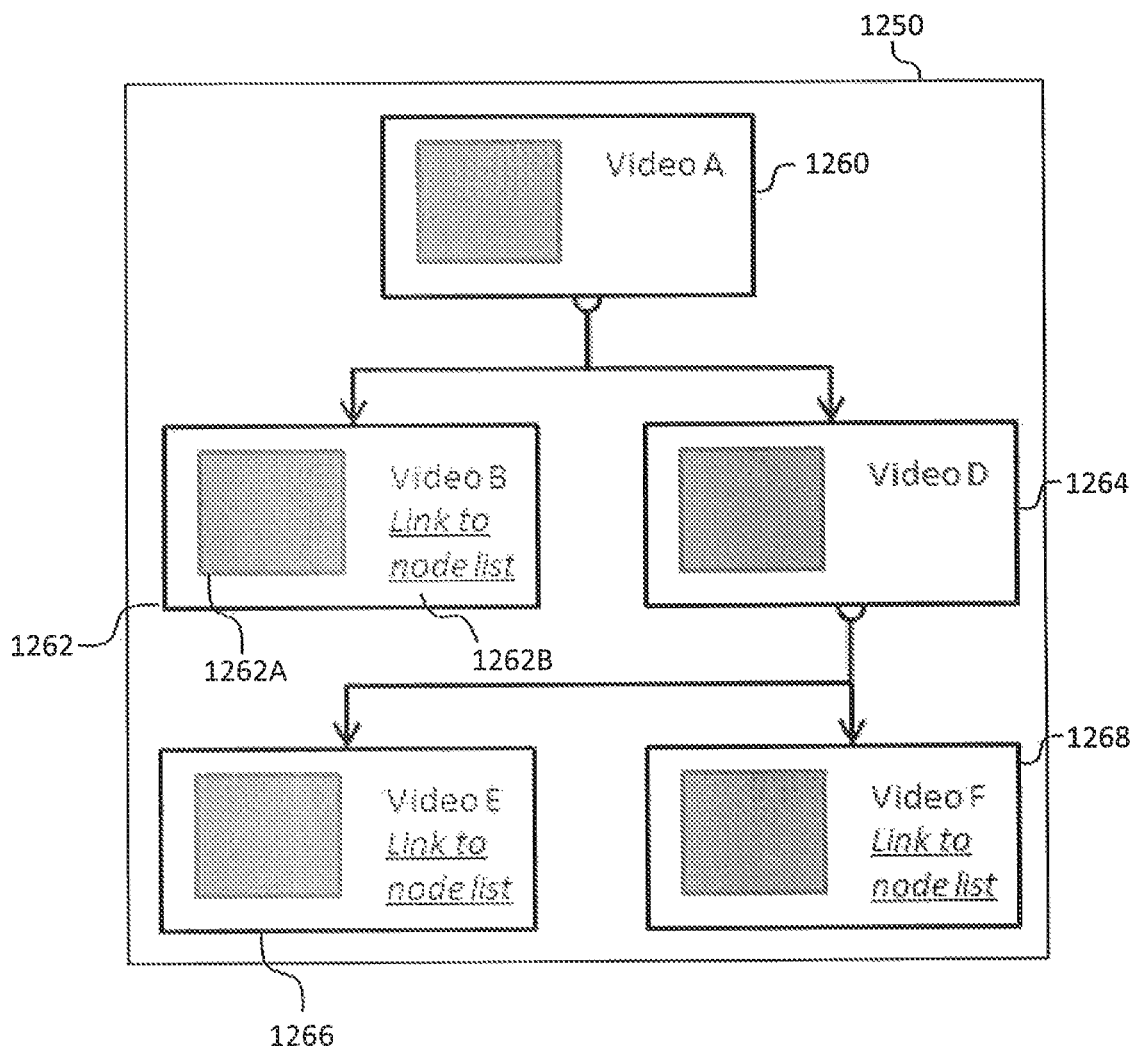

FIG. 12B illustrates an additional exemplary interface 1250 through which a user device may present a ranked list of video clips to a user, according to disclosed embodiments. In contrast to exemplary interface 1200 of FIG. 12A, interface 1250 graphically illustrates a hierarchical relationship between videos within the ranked list, for example, as specified within video graph data.

For example, as described above, a user may have selected "Video A" from a corresponding list of displayed video clips, and recommendations server 142 may generate a ranked list based on an analysis of video graph data, as described above in reference to FIG. 11. In such an embodiment, the ranked list may include video clip "Video A," as well as video clips "Video B," "Video C," "Video D," and "Video E" identified using the exemplary method 1100.

In FIG. 12B, video clips "Video A," "Video B," "Video D," "Video E," and "Video F" are associated with corresponding ones of nodes 1260, 1262, 1264, 1266, and 1268 within interface 1250. Further, interface 1250 also indicates graphically a relationship between video clips "Video A," "Video B," "Video D," "Video E," and "Video F" within the corresponding video graph data. For example, interface 1250 indicates that node 1260 is linked to nodes 1262 and 1264, and as such, "Video A" is associated with "Video B" and "Video D" within one or more video graphs. Similarly, interface 1250 also indicates that node 1264 linked to nodes 1266 and 1268, and as such, "Video D" is associated with "Video E" and "Video F" within one or more video graphs.

Further, in FIG. 12B, previews and video graph information of video graphs "Video B," "Video E," and "Video F" may be displayed within corresponding ones of nodes 1262, 1266, and 1268 within interface 1250. For example, in node 1262, a preview of "Video B" may be displayed within to the user within region 1262A, and video graph data associated with the "Video B" may be displayed in region 1262B. For example, the displayed preview may include, but is not limited to, a portion of "Video B," a still image associated with a portion of "Video B," or any additional or alternate representation of the subject matter of "Video B" apparent to one of skill in the art. Further, for example, the video graph data corresponding to "Video B" may include, but is not limited to, one or more embedded hyperlinks that direct a user to video clips associated with "Video B." In such an embodiment, the user may click or otherwise activate a portion of the one of the embedded hyperlinks to access the corresponding video clip. Further, the user may click or otherwise activate a portion of region 1262A, in which the preview of "Video B" is displayed, to gain access for video content associated with "Video B."

In additional embodiments, not depicted in FIG. 12B, nodes 1260 and 1264 may include regions that display respective previews of "Video A" and "Video D," and further regions that display video graph data including embedded hyperlinks to video content associated, respectively, with "Video A" and "Video D." In such embodiments, the user may click on a preview to gain access to a corresponding video clip, or may click on a hyperlink to gain access to a video clip associated with the corresponding video, as described above.

In the exemplary embodiment of FIG. 11, recommendations system 140 generates a ranked list of video clips that are relevant to a user's selection of an video clip, and additionally or alternative, to a user's selection of a list of video clips. As such, FIG. 11 enables recommendations system 140 to enhance an ability of the user to browse and subsequently view video clips that are consistent with the user's interest, or alternatively, with the interests of other users having consumption patterns similar to the user.

The disclosed embodiments are, however, not limited to recommendations system that enhance a user's browsing experience. In additional embodiments, recommendations system 140 may facilitate a discovery of video content relevant to the user's interest during search and retrieval processes, as described below in reference to FIG. 13.

Figure 13:
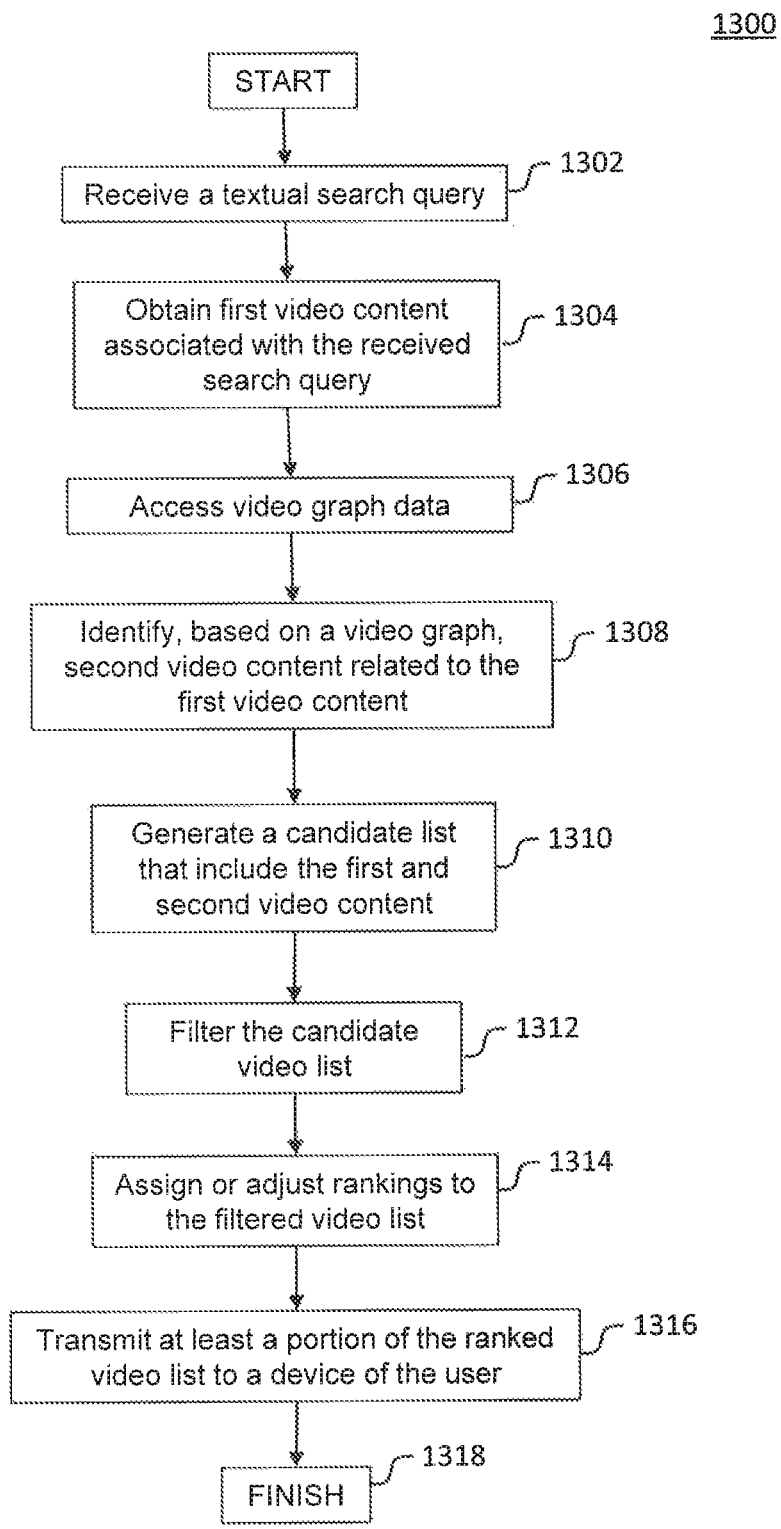
FIG. 13 is a flowchart of an exemplary method for identifying similar elements of video content, according to disclosed embodiments.

FIG. 13 is a flowchart of an additional exemplary method 1300 for providing recommendations of video content based on video graph data, according to disclosed embodiments. Method 1300 may provide functionality that enables a recommendations system (e.g., recommendations system 140) to identify additional video content having contextual similarity with video content related to a textual search query, and additionally or alternatively, that has been viewed by users whose viewing habits are similar to the requesting user.

Figure 14A:
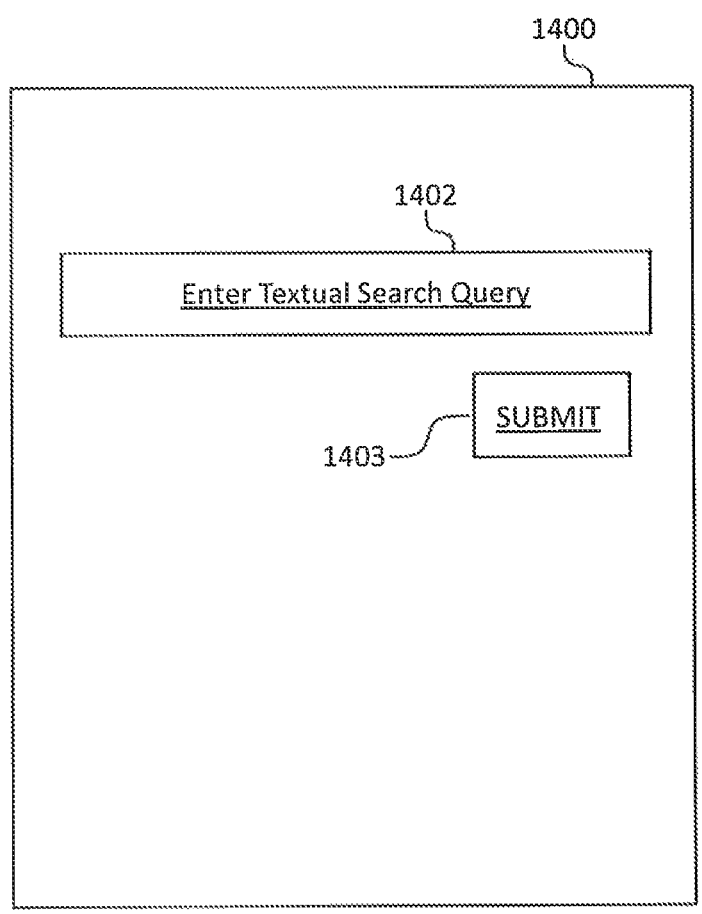
FIGS. 14A and 14B are diagrams of exemplary interfaces for displaying video content, according to disclosed embodiments.

In an embodiment, a user of a user device (e.g., user device 102) may access a web page or other interface associated with recommendations system 140, and may enter a textual search query into a corresponding region of the accessed web page and submit the textual search query by clicking on a corresponding region of the web page, entering a keystroke, or through any additional or alternate activation technique appropriate to the web page. For example, as depicted in FIG. 14A, the user may access web page 1400 and enter a corresponding textual search query in region 1402. The user may subsequently submit the textual search query by clicking or otherwise activating "Submit" button 1403. Upon submission of the request, user device 102 may establish a connection with recommendations system 140 over communications network 120, and may subsequently transmit information associated with the textual search query to recommendations server 142.

Referring back to FIG. 13, recommendations server 142 may receive the information associated with the textual search query from user device 102 in step 1302. In an embodiment, the received information may include the textual search query entered by the user into the website associated with recommendations server 142, and additionally, information that identifies one or more characteristics of the user. For example, such identifying information may include demographic information (e.g., age), employment information, one or more social networking applications associated with the user, geographic information associated with the user (e.g., an employment location, a residential location, or a preferred geographic location), and one or more contextual or structural preferences of the user. Further, in an embodiment, the identifying information may specify one or more social networking applications with which the user is associated, and additionally or alternatively, one or more additional users that are linked to the user within the social networking applications.

In step 1304, and upon receipt of the textual search query and/or the user information, recommendations server 142 may identify one or more first video clips that are relevant to the textual search query. For example, recommendations server 142 may access a content data repository (e.g., content data store 144A of FIG. 1) that stores a plurality of video clips and metadata corresponding to the video clips. In such an embodiment, at least a portion of the textual search query may be compared against metadata associated with the available video clips to identify the first video clips that are contextually related to the search query.

The identification of the first video clips is not, however, limited to such exemplary processes. In additional embodiments, recommendations server 142 may identify the first video clips relevant to the received search query within any additional or alternate data repository accessible across communications network 120, or using any additional or alternate technique appropriate to the video clips and the received search query, without departing from the spirit or scope of the disclosed embodiments.

Upon identification of the first video clips, in step 1306, recommendations server 142 may access data associated with one or more video graphs that reference the video content of the first video clips. For example, and as described above, recommendation server 142 may access a video graph repository (e.g., video graph data store 144B of FIG. 1) to obtain the video graph data.

Further, in such embodiments, the video graph data may indicate an association between portions of the first video clips and corresponding segments of second video clips based on, for example, an auditory similarity, a visual similarity, a combination of an auditory and a visual similarity, similar values of characteristic parameters (e.g., one or more of the metadata parameters outlined above), and additionally or alternatively, based on popularity of the additional video clips with linked users (e.g., as expressed through an expanded video graph that links associated video clips to corresponding associated users within a social network). For example, such video graphs may be generated through an application of one or more association rules that express limitations on auditory similarity, visual similarity, parameter values, and popularity, as described above.

In step 1308, recommendations server 142 may leverage the video graph data to identify one or more second video clips that are associated with the candidate list. For example, as described above, the video graph data may include association values that express the degree of similarity between segments of the candidate video clips and corresponding segments of the second video clips. Information associated with the second video clips may be combined with information associated with the first video clips to form a candidate video list in step 1310.

In an embodiment, a predetermined number of the first and second video clips may be selected in step 1310 for inclusion within the candidate list. For example, the first and second video clips may be assigned initial ranks in accordance with one or more factors, and recommendations server 142 may select a predetermined number of the first and second video clips in step 1310 for inclusion within the candidate video list. In such embodiments, the factors facilitating the initial ranking of the video clips may include, but are not limited to, a number videos linked to each of the video clips, a popularity of the video clips, and any additional or alternate factor available from the accessed video graph data.

In step 1312, the candidate video clips may be filtered by recommendations server 142 to generate a filtered video list. For example, and as described above, the filtering processes of step 1310 may leverage the accessed video graph data to identify a group or groups of video clips that are identical or substantially similar, and to retain a video clip from the group that is associated with a highest quality and/or a quality that is suited to the user. Similarly, among a group of identical or substantially similar videos, a video may be discarded if that video has been previously viewed by the selecting user, or if that video was accessed by the user but never viewed. Additionally or alternatively, the filtering processes of step 1310 may also leverage video graph data to identify video clips within the candidate list that are similar or identical to videos watched by one or more additional users associated with the user of user device 102, i.e., users connected to the user through a corresponding social network, as described in reference to FIG. 9.

In step 1314, recommendations server 142 may adjust or assign rankings to the video clips within the filtered video list. For example, recommendations server 142 may access video graph data associated with the video clips of the filtered video list, and may adjust an existing ranking or assign a new ranking to a particular video clip in step 1312 based on a number of video clips associated with the particular video clip within the accessed video graph data.

However, the ranking of a video clip within step 1314 need not be based solely on video graph data, and in additional embodiments, recommendations server 142 adjust the ranking or assign the new ranking to the particular video clip based on metadata associated with the particular video clip. For example, such metadata may indicate a number of additional video clips associated with the particular video clip, a number of additional video clips that describe a event, a scene or type of scene, an individual referenced by the particular video clip, or any additional or alternative information, as described above in reference to FIG. 11. Further, in step 1314, recommendations server 142 may assign a ranking to the particular video clip based on a consumption of the particular video clip by other users, and additionally or alternatively, a consumption of video clips having content similar to that of the particular video clip.

Referring back to FIG. 13, in step 1316, recommendations server 142 may transmit information associated with the ranked video clips to user device 102, which may receive the receive the information, render the received information, and display the information associated with the video clips to the user in accordance with the ranking. Further, in addition to the ranked video list, recommendations server 142 may also transmit video graph information corresponding to one or more of the ranked video clips to user device 102 in step 1316. Method 1300 is finished and completed in step 1318.

Figure 14B:
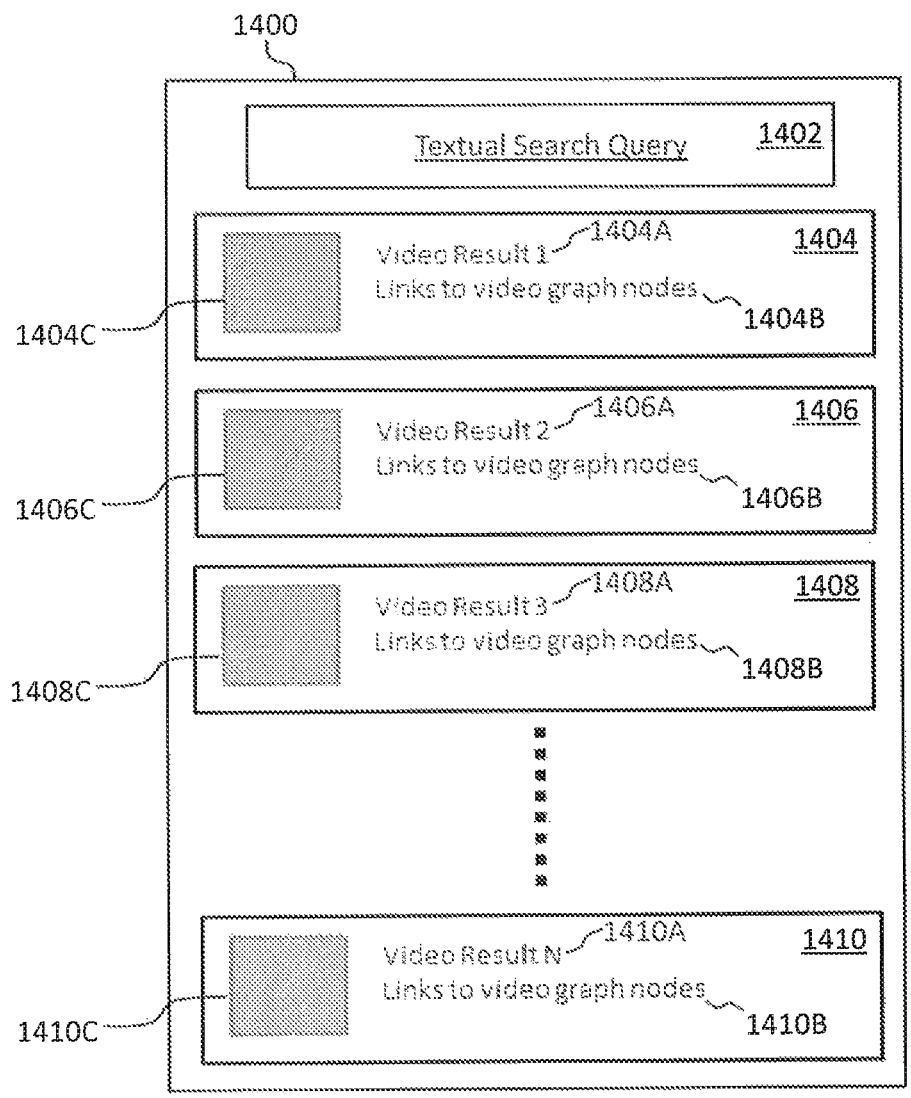

Upon receipt of the filtered video list, user device 102 may present the ranked video clips to the user in list form as depicted in FIG. 14B. In 14B, user device 102 presents the ranked list of video clips to the user within interface 1400 in regions 1404, 1406, 1408, and 1410. For example, region 1404, which is associated with "Video Result 1," includes information 1404A identifying the video clip associated with "Video Result 1," information 1404B related to the video graph data associated with "Video Result 1," and a preview 1404C of the video clip associated with "Video Result 1." Similar information and corresponding previews are included within locations 1406, 1408, and 1410 corresponding to "Video Result 2," "Video Result 3," and "Video Result N," i.e., the $N^{th}$ of the plurality of search results.

For example, in region 1404, preview 1404C and information 1404A identifying the "Video Result 1" may represent hyperlinks embedded into interface 1400. In such embodiments, the user may access a video clip associated with "Video Result 1" by clicking or otherwise activating a corresponding one of the embedded hyperlinks. Similarly, information 1404B related to the video graph data associated with "Video Result 1" may include one or more embedded hyperlinks that, upon activation by the user, direct the user to one or more video clips linked to "Video Result 1" within the video graph data. In such embodiments, upon activation of one or more of the hyperlinks, the user may directly access the corresponding video clip, or may alternatively be directed to a website or other interface that displays the content to the user.

In the embodiments described above, a user device (e.g., user devices 102 or 112) transmits information associated with a video clip of interest to a user, and additionally or alternatively, a textual search query, to recommendations system 140 over communications network 120. Based on the received information and/or textual search query, recommendations system 140 may leverage video graph data to identify one or more video clips of potential interest to the user, and may transmit the recommended video clips to the user device over communications network 120. In such embodiments, the user may interact directly with recommendations system 140 via user devices 102 or 112, the recommendations system 140 may function as either a provider of electronic content or a search engine.

The disclosed embodiments are not, however, limited to direct interaction between recommendations system 140 and a user at a user device. For example, the user at the user device may access a website or other suitable interface associated with a search engine or a content provider (e.g., a news organization, such as nytimes.com, and a provider of streaming video, such as hulu.com and youtube.com). In such embodiments, the search engine or content provider may be associated with an additional web server in communications with recommendations system 140 and user devices 102 and 112 across network 120.

In response to an input from the user (e.g., a user entry of a textual search query or a user selection of a video clip from a displayed list), the additional web server may programmatically establish a connection with recommendations system 140 and may subsequently transmit information associated with the selected video clip and/or the textual search query to recommendations system 140. Recommendations system 140 may leverage the video graph data to identify one or more video clips of potential interest to the user, and may transmit information associated with recommended video clips to the additional web server, which may subsequently provide the information to the user device for rendering and display to the user.

In the exemplary embodiments described above, reference is made to systems and methods that process, identify, and associate similar video clips and/or videos. However, the disclosed embodiments are not limited to such exemplary video clips and videos. In further embodiments, the processes described above may process, identify, and associate any additional or alternate element of video content or element of multimedia content apparent to one of skill in the art and associated with a corresponding duration, corresponding starting and completion times, and corresponding contextual and structural characteristics.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the invention being indicated by the following listing of exemplary claims.

What is claimed:

1. A computer-implemented method for identifying associated video content, comprising:

decomposing first and second elements of video content into corresponding first and second segments;

computing measures of similarity between candidate pairs of the first and second video segments;

determining, using at least one processor, that the similarity measures corresponding to a subset of the candidate pairs satisfy at least one association rule;

for a plurality of the candidate pairs of the subset, determining, using the processor, that corresponding ones of the first segments are disposed adjacently within the first video content element, and that corresponding ones of the second segments are disposed adjacently within the second video content element;

merging, using the at least one processor, (i) the corresponding first segments to generate a merged first segment and (ii) the corresponding second segments to generate a merged second segment, the merged first and second segments establishing a merged pair of first and second segments; and generating a value indicative of an association between the merged pair of first and second segments, wherein computing measures of similarity comprises:

extracting a first auditory sample from at least one of the first video segments and a second auditory sample from at least one of the second video segments, the first and second auditory samples comprising pluralities of frames;

generating representations of a power spectrum associated with the frames of the first and second auditory samples; and computing the similarity measure for the at least one first and second video segments based on the generated power spectrum representations.

2. The method of claim 1, further comprising obtaining first metadata associated with the first element of video content and second metadata associated with the second element of video content.

3. The method of claim 2, wherein:
the method further comprises determining whether the first and second elements of video content satisfy the at least one association rule, based on the first and second metadata; and
wherein the decomposing comprises decomposing the first and second elements of video content into the corresponding first and second segments, when the first and second elements of video content satisfy the at least one association rule.

4. The method of claim 2, further comprising:
obtaining information associated with a characteristic of the first element of video content or the second element of video content;
incorporating the obtained information within the metadata of the associated first and second elements of video content.

5. The method of claim 2, wherein the computing comprises:
extracting at least one of auditory samples or visual samples from the first and second video segments;
calculating fingerprints corresponding to the extracted samples; and
computing the similarity measure for the first and second video segments based on the fingerprints.

6. The method of claim 1, wherein:
the association rule identifies a threshold value for the similarity measure; and
determining whether the similarity measure satisfies the association rule comprises determining whether the similarity value exceeds the threshold value.

7. The method of claim 1, wherein:
the association rule identifies specifies a characteristic of video content; and
determining whether the similarity measure satisfies the association rule comprises determining whether the first and second elements of video content are associated with the specified characteristic.

8. The method of claim 7, wherein the characteristic comprises at least one of a predetermined duration, a video quality, a video type, a performer associated with the video content, or a source of the video content.

9. The method of claim 1, wherein the first and second elements of video content comprise video clips.

10. The method of claim 1, further comprising generating video graph data indicative of a link between the first and second elements of video content, based on at least the value indicative of the association between the first and second elements of video content.

11. The method of claim 1, further comprising:
receiving information associated with a third element of video content;

obtaining, in response to the received information, data associated with at least one video graph;
identifying one or more fourth elements of video content that are similar to the third element of video content, the identification being based on the obtained video graph data, the video graph data comprising information indicative of the similarity between the third and fourth elements of video content; and
identifying at least a subset of the third and fourth elements of video content for delivery to a user.

12. An apparatus, comprising:
a storage device; and
at least one processor coupled to the storage device, wherein the storage device stores a program for controlling the at least one processor, and wherein the at least one processor, being operative with the program, is configured to:
decompose first and second elements of video content into corresponding first and second segments;
compute measures of similarity between candidate pairs of the first and second video segments;
determine that the similarity measures corresponding to a subset of the candidate pairs satisfy at least one association rule;
for a plurality of candidate pairs of the subset, determine that corresponding ones of the first segments are disposed adjacently within the first video content element, and that corresponding ones of the second segments are disposed adjacently within the second video content element;
merge (i) the corresponding first segments to generate a merged first segment and (ii) the corresponding second segments to generate a merged second segment, the merged first and second segments establishing a merged pair of first and second segments; and
generate a value indicative of an association between the merged pair of first and second segments,
the processor being further configured to:
extract a first auditory sample from at least one of the first video segments and a second auditory sample from at least one of the second video segments, the first and second auditory samples comprising pluralities of frames:
generate representations of a power spectrum associated with the frames of the first and second auditory samples; and
compute the similarity measure for the at least one first and second video segments based on the generated power spectrum representations.

13. The apparatus of claim 12, wherein the processor is further configured to:
obtain first metadata associated with the first element of video content and second metadata associated with the second element of video content;
determine whether the first and second elements of video content satisfy the at least one association rule, based on the first and second metadata; and
decompose the first and second elements of video content into the corresponding first and second segments, when the first and second elements of video content satisfy the at least one association rule.

14. The apparatus of claim 12, wherein the processor is further configured to:
obtain information associated with a characteristic of the first element of video content or the second element of video content;

incorporate the obtained information within the metadata of the associated first and second elements of video content.

15. The apparatus of claim 12, wherein the processor is further configured to:
   extract at least one of auditory samples or visual samples from the first and second video segments;
   calculate fingerprints corresponding to the extracted samples; and
   compute the similarity measure for the first and second video segments based on the fingerprints.

16. The apparatus of claim 12, wherein:
   the association rule identifies a threshold value for the similarity measure; and
   the processor is further configured to determine whether the similarity measure satisfies the association rule comprises determining whether the similarity value exceeds the threshold value.

17. The apparatus of claim 12, wherein:
   the association rule identifies specifies a characteristic of video content; and
   the processor is further configured to determine whether the similarity measure satisfies the association rule comprises determining whether the first and second elements of video content are associated with the specified characteristic.

18. The apparatus of claim 12, wherein the first and second elements of video content comprise video clips.

19. The apparatus of claim 12, wherein the processor is further configured to generate video graph data indicative of a link between the first and second elements of video content, based on at least the value indicative of the association between the first and second elements of video content.

20. The apparatus of claim 12, wherein the processor is further configured to:
   receive information associated with a third element of video content;
   obtain, in response to the received information, data associated with at least one video graph;
   identify one or more fourth elements of video content that are similar to the third element of video content, the identification being based on the obtained video graph data, the video graph data comprising information indicative of the similarity between the third and fourth elements of video content; and
   identify at least a subset of the third and fourth elements of video content for delivery to a user.

21. A tangible, non-transitory computer-readable medium storing instructions that, when executed by at least one processor, perform a method identifying associated video content, the method comprising the steps of:
   decomposing first and second elements of video content into corresponding first and second segments;
   computing measures of similarity between candidate pairs of the first and second video segments;
   determining that the similarity measures corresponding to a subset of the candidate pairs satisfy at least one association rule;
   for a plurality of candidate pairs of the subset, determining that corresponding ones of the first segments are disposed adjacently within the first video content element, and that corresponding ones of the second segments are disposed adjacently within the second video content element;
   merging the corresponding first segments to generate a merged first segment, and the corresponding second segments to generate a merged second segment, the merged first and second segments establishing a merged pair of first and second segments; and
   generating a value indicative of an association between the merged pair of first and second segments,
   wherein computing measures of similarity comprises:
      extracting a first auditory sample from at least one of the first video segments and a second auditory sample from at least one of the second video segments, the first and second auditory samples comprising pluralities of frames;
      generating representations of a power spectrum associated with the frames of the first and second auditory samples; and
      computing the similarity measure for the at least one first and second video segments based on the generated power spectrum representations.

22. The method of claim 1, further comprising:
   obtaining information identifying a prior consumption of at least one of audio or video content by a user; and
   identifying at least one of the first or second video content based on the prior consumption information.

* * * * *